(12) United States Patent
Yamamoto

(10) Patent No.: US 10,536,614 B2
(45) Date of Patent: Jan. 14, 2020

(54) LIGHTING DEVICE THAT PERFORMS CHARGE COMPLETION INFORMATION NOTIFICATION, AND METHOD OF CONTROLLING THE SAME

(71) Applicant: CANON KABUSHIKI KAISHA, Tokyo (JP)

(72) Inventor: Yuji Yamamoto, Kasukabe (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/937,082

(22) Filed: Mar. 27, 2018

(65) Prior Publication Data

US 2018/0288286 A1 Oct. 4, 2018

(30) Foreign Application Priority Data

Mar. 28, 2017 (JP) .................. 2017-062926

(51) Int. Cl.
*H04N 5/222* (2006.01)
*H04N 5/067* (2006.01)
*H04N 5/225* (2006.01)
*H04N 5/235* (2006.01)

(52) U.S. Cl.
CPC .......... *H04N 5/067* (2013.01); *H04N 5/2256* (2013.01); *H04N 5/2354* (2013.01)

(58) Field of Classification Search
CPC .... H04N 5/067; H04N 5/2354; H04N 5/2256; H04N 5/23206; G03B 15/05
See application file for complete search history.

(56) References Cited

U.S. PATENT DOCUMENTS

| 2007/0223901 A1* | 9/2007 | Fujimoto | G03B 17/00 396/56 |
| 2009/0135262 A1* | 5/2009 | Ogasawara | G03B 15/02 348/211.4 |
| 2010/0202767 A1* | 8/2010 | Shirakawa | G03B 15/05 396/56 |

(Continued)

FOREIGN PATENT DOCUMENTS

JP 2013-24945 A 2/2013

*Primary Examiner* — Sinh Tran
*Assistant Examiner* — Selam T Gebriel
(74) *Attorney, Agent, or Firm* — Carter, DeLuca & Farrell LLP

(57) ABSTRACT

A technique in multi-light control capable of notifying an image pickup apparatus of charge completion information items of a plurality of lighting devices. A lighting device is wirelessly communicably connected to other lighting devices, and is communicably attached to an image pickup apparatus so as to be driven in synchronism with the other lighting devices. First charge completion information of the lighting device itself and second charge completion information of the other lighting devices are transmitted to the image pickup apparatus either in a combined state or in a separate state. If it is determined that an instruction for transmitting the first charge completion information and the slave charge completion information in the separate state has been received from the image pickup apparatus, the first charge completion information and the slave charge completion information are transmitted to the image pickup apparatus in the separate.

20 Claims, 27 Drawing Sheets

PLURAL CHARGE COMPLETION INFORMATION- DESIGNATING COMMUNICATION

|  | 1ST BYTE | 2ND BYTE |
|---|---|---|
| CAMERA COMMUNICATION DATA | 40 | 0 |
| STROBE COMMUNICATION DATA | 0 | DATA 1 |

| DATA 1 | 0: INCOMPATIBLE WITH PLURAL CHARGE COMPLETION INFORMATION<br>1: COMPATIBLE WITH PLURAL CHARGE COMPLETION INFORMATION |
|---|---|

PLURAL SLAVE CHARGE COMPLETION INFORMATION COMMUNICATION

|  | 1ST BYTE | 2ND BYTE | 3RD BYTE | 4TH BYTE |
|---|---|---|---|---|
| CAMERA COMMUNICATION DATA | 50 | 0 | 0 | 0 |
| STROBE COMMUNICATION DATA | 0 | DATA 1 | DATA 2 | DATA 3 |

| DATA 1 | NUMBER OF CONNECTED SLAVE STROBES (0-16) |
|---|---|

| DATA 2 | BIT 7 | BIT 6 | BIT 5 | BIT 4 | BIT 3 | BIT 2 | BIT 1 | BIT 0 |
|---|---|---|---|---|---|---|---|---|
|  | SLAVE 8 | SLAVE 7 | SLAVE 6 | SLAVE 5 | SLAVE 4 | SLAVE 3 | SLAVE 2 | SLAVE 1 |

0: CHARGING INCOMPLETE 1: CHARGING COMPLETED

| DATA 3 | BIT 15 | BIT 14 | BIT 13 | BIT 12 | BIT 11 | BIT 10 | BIT 9 | BIT 8 |
|---|---|---|---|---|---|---|---|---|
|  | SLAVE 16 | SLAVE 15 | SLAVE 14 | SLAVE 13 | SLAVE 12 | SLAVE 11 | SLAVE 10 | SLAVE 9 |

0: CHARGING INCOMPLETE 1: CHARGING COMPLETED

(56) References Cited

U.S. PATENT DOCUMENTS

| | | | |
|---|---|---|---|
| 2013/0050510 A1* | 2/2013 | Fujihashi | G03B 15/05 348/207.1 |
| 2013/0128101 A1* | 5/2013 | Midorikawa | H04N 5/2256 348/371 |
| 2013/0193853 A1* | 8/2013 | Gouji | H05B 37/02 315/130 |
| 2017/0013699 A1* | 1/2017 | Midorikawa | H05B 37/0272 |

* cited by examiner

FIG. 9A

PLURAL CHARGE COMPLETION INFORMATION- DESIGNATING COMMUNICATION

|  | 1ST BYTE | 2ND BYTE |
|---|---|---|
| CAMERA COMMUNICATION DATA | 40 | 0 |
| STROBE COMMUNICATION DATA | 0 | DATA 1 |

| DATA 1 | 0: INCOMPATIBLE WITH PLURAL CHARGE COMPLETION INFORMATION<br>1: COMPATIBLE WITH PLURAL CHARGE COMPLETION INFORMATION |
|---|---|

FIG. 9B

PLURAL SLAVE CHARGE COMPLETION INFORMATION COMMUNICATION

|  | 1ST BYTE | 2ND BYTE | 3RD BYTE | 4TH BYTE |
|---|---|---|---|---|
| CAMERA COMMUNICATION DATA | 50 | 0 | 0 | 0 |
| STROBE COMMUNICATION DATA | 0 | DATA 1 | DATA 2 | DATA 3 |

| DATA 1 | NUMBER OF CONNECTED SLAVE STROBES (0-16) |
|---|---|

| DATA 2 | BIT 7 | BIT 6 | BIT 5 | BIT 4 | BIT 3 | BIT 2 | BIT 1 | BIT 0 |
|---|---|---|---|---|---|---|---|---|
|  | SLAVE 8 | SLAVE 7 | SLAVE 6 | SLAVE 5 | SLAVE 4 | SLAVE 3 | SLAVE 2 | SLAVE 1 |

0: CHARGING INCOMPLETE 1: CHARGING COMPLETED

| DATA 3 | BIT 15 | BIT 14 | BIT 13 | BIT 12 | BIT 11 | BIT 10 | BIT 9 | BIT 8 |
|---|---|---|---|---|---|---|---|---|
|  | SLAVE 16 | SLAVE 15 | SLAVE 14 | SLAVE 13 | SLAVE 12 | SLAVE 11 | SLAVE 10 | SLAVE 9 |

0: CHARGING INCOMPLETE 1: CHARGING COMPLETED

FIG. 9C

ALL SLAVE CHARGE COMPLETION INFORMATION COMMUNICATION

| | 1ST BYTE | 2ND BYTE |
|---|---|---|
| CAMERA COMMUNICATION DATA | 51 | 0 |
| STROBE COMMUNICATION DATA | 0 | DATA 1 |

| DATA 1 | 0: CHARGING INCOMPLETE<br>1: CHARGING OF ALL SLAVE STROBES COMPLETED<br>3: NO SLAVE STROBE |
|---|---|

FIG. 18A

PLURAL CHARGE COMPLETION
INFORMATION-INCOMPATIBLE
STROBE MODEL TABLE

| STROBE MODEL CODE |
| --- |
| 1 |
| 2 |
| 4 |
| 7 |
| 9 |
| 12 |

FIG. 18B

PLURAL CHARGE COMPLETION
INFORMATION-INCOMPATIBLE
CAMERA MODEL TABLE

| CAMERA MODEL CODE |
| --- |
| 1 |
| 3 |
| 6 |
| 7 |
| 9 |
| 11 |
| 13 |
| 15 |
| 16 |
| 18 |

FIG. 19A

MODEL INFORMATION COMMUNICATION

|  | 1ST BYTE | 2ND BYTE |
|---|---|---|
| CAMERA COMMUNICATION DATA | 53 | CAMERA MODEL CODE |
| STROBE COMMUNICATION DATA | 0 | STROBE MODEL CODE |

FIG. 19B

MASTER CHARGE COMPLETION INFORMATION

|  | 1ST BYTE | 2ND BYTE |
|---|---|---|
| CAMERA COMMUNICATION DATA | 54 | 0 |
| STROBE COMMUNICATION DATA | 0 | DATA 1 |

| DATA 1 | 0: CHARGING INCOMPLETE<br>1: CHARGING COMPLETED |
|---|---|

FIG. 23

MASTER & SLAVE CHARGE COMPLETION INFORMATION COMMUNICATION

|  | 1ST BYTE | 2ND BYTE |
|---|---|---|
| CAMERA COMMUNICATION DATA | 55 | 0 |
| STROBE COMMUNICATION DATA | 0 | DATA 1 |

| DATA 1 | 0: CHARGING OF MASTER OR SLAVE INCOMPLETE<br>1: CHARGING OF MASTER & ALL SLAVES COMPLETED |
|---|---|

FIG. 25

MASTER & SLAVE CHARGE COMPLETION INFORMATION COMMUNICATION

|  | 1ST BYTE | 2ND BYTE | 3RD BYTE |
|---|---|---|---|
| CAMERA COMMUNICATION DATA | 60 | 0 | 0 |
| STROBE COMMUNICATION DATA | 0 | DATA 1 | DATA 2 |

| DATA 1 | NUMBER OF CONNECTED SLAVE STROBES (0-7) |
|---|---|

| DATA 2 | BIT 7 | BIT 6 | BIT 5 | BIT 4 | BIT 3 | BIT 2 | BIT 1 | BIT 0 |
|---|---|---|---|---|---|---|---|---|
|  | SLAVE 7 | SLAVE 6 | SLAVE 5 | SLAVE 4 | SLAVE 3 | SLAVE 2 | SLAVE 1 | MASTER |

0: CHARGING INCOMPLETE  1: CHARGING COMPLETED

LIGHTING DEVICE THAT PERFORMS CHARGE COMPLETION INFORMATION NOTIFICATION, AND METHOD OF CONTROLLING THE SAME

BACKGROUND OF THE INVENTION

Field of the Invention

The present invention relates to a lighting device, such as a strobe device, that notifies an image pickup apparatus, such as a digital camera, of charge completion information, and a method of controlling the same.

Description of the Related Art

In a strobe device attached to an image pickup apparatus, such as a digital camera, there has been conventionally employed a method of notifying the image pickup apparatus of charge completion information, by communication with the image pickup apparatus, or by a change in a terminal voltage level of a connection terminal connected to the image pickup apparatus. Further, even when a plurality of other strobe devices are connected to the strobe device by wireless communication, the charge completion information is notified to the image pickup apparatus as one piece of information.

Conventionally, there has been proposed a strobe system including a master strobe device that is capable of communicating with an image pickup apparatus, and slave strobe devices that are capable of performing bidirectional wireless communication with the master strobe device (Japanese Laid-Open Patent Publication (Kokai) No. 2013-24945). This proposal discloses a mechanism for avoiding collision between communication for release control from the master strobe device and information communication from the slave strobe devices, in multi-light control.

However, Japanese Laid-Open Patent Publication (Kokai) No. 2013-24945 does not disclose, concerning the charge completion information to be notified to the image pickup apparatus, a mechanism for notifying the image pickup apparatus of the charge completion information of a plurality of strobe devices.

SUMMARY OF THE INVENTION

The present invention provides a technique in multi-light control for making it possible, even in a case where there are charge completion information items of a plurality of lighting devices, to notify an image pickup apparatus of the charge completion information items of the plurality of lighting devices.

In a first aspect of the present invention, there is provided a lighting device that is connected to a desired number of other lighting devices in a manner capable of performing wireless communication therewith, and is communicably attached to an image pickup apparatus, so as to be driven in synchronism with the other lighting devices, comprising at least one processor executing programs stored in a memory to function as an acquisition unit configured to acquire charge completion information of the lighting device itself as first charge completion information, and acquire charge completion information of the other lighting devices, from the other lighting devices, as second charge completion information, a transmission unit configured to transmit the first charge completion information and the second charge completion information in a combined state or transmit the first charge completion information and the second charge completion information in a separate state, and a determination unit configured to determine whether or not an instruction for transmitting the first charge completion information and the second charge completion information in the separate state has been received from the image pickup apparatus by communication with the image pickup apparatus, wherein in a case where it is determined by the determination unit that the instruction for transmitting the first charge completion information and the second charge completion information in the separate state has been received from the image pickup apparatus, the transmission unit transmits the first charge completion information and the second charge completion information to the image pickup apparatus in the separate state.

In a second aspect of the present invention, there is provided a lighting device that is connected to a desired number of other lighting devices in a manner capable of performing wireless communication therewith, and is communicably attached to an image pickup apparatus, so as to be driven in synchronism with the other lighting devices, comprising at least one processor executing programs stored in a memory to function as an acquisition unit configured to acquire charge completion information of the lighting device itself as first charge completion information, and acquire charge completion information of the other lighting devices, from the other lighting devices, as second charge completion information, a transmission unit configured to transmit the first charge completion information and the second charge completion information in a combined state or transmit the first charge completion information and the second charge completion information in a separate state, and a determination unit configured to determine whether or not the image pickup apparatus can receive the first charge completion information and the second charge completion information in the separate state, based on model information of the image pickup apparatus, acquired by communication with the image pickup apparatus, wherein in a case where it is determined by the determination unit that the image pickup apparatus can receive the first charge completion information and the second charge completion information in the separate state, the transmission unit transmits the first charge completion information and the second charge completion information to the image pickup apparatus in the separate state.

In a third aspect of the present invention, there is provided a method of controlling a lighting device that is connected to a desired number of other lighting devices in a manner capable of performing wireless communication therewith, and is communicably attached to an image pickup apparatus, so as to be driven in synchronism with the other lighting devices, the lighting device acquiring charge completion information of the lighting device itself as first charge completion information, and acquiring charge completion information of the other lighting devices, from the other lighting devices, as second charge completion information, the method comprising transmitting the first charge completion information and the second charge completion information in a combined state or transmitting the first charge completion information and the second charge completion information in a separate state, and determining whether or not an instruction for transmitting the first charge completion information and the second charge completion information in the separate state has been received from the image pickup apparatus by communication with the image pickup apparatus, wherein said transmitting includes, in a case where it is determined that the instruction for transmitting the first charge completion information and the second charge completion information in the separate state has been received from the image pickup apparatus, transmitting the first charge completion information and the second charge completion information to the image pickup apparatus in the separate state.

In a fourth aspect of the present invention, there is provided a method of method of controlling a lighting device that is connected to a desired number of other lighting devices in a manner capable of performing wireless communication therewith, and is communicably attached to an image pickup apparatus, so as to be driven in synchronism with the other lighting devices, the lighting device acquiring charge completion information of the lighting device itself as first charge completion information, and acquiring charge completion information of the other lighting devices, from the other lighting devices, as second charge completion information, the method comprising transmitting the first charge completion information and the second charge completion information in a combined state or transmitting the first charge completion information and the second charge completion information in a separate state, and determining whether or not the image pickup apparatus can receive the first charge completion information and the second charge completion information in the separate state, based on model information of the image pickup apparatus, acquired by communication with the image pickup apparatus, wherein said transmitting includes, in a case where it is determined that the image pickup apparatus can receive the first charge completion information and the second charge completion information in the separate state, transmitting the first charge completion information and the second charge completion information to the image pickup apparatus in the separate state.

According to the present invention, in multi-light control, even when there are charge completion information items of a plurality of lighting devices, it is possible to notify the image pickup apparatus of the charge completion information items of the plurality of lighting devices.

Further features of the present invention will become apparent from the following description of exemplary embodiments (with reference to the attached drawings).

BRIEF DESCRIPTION OF THE DRAWINGS

FIG. 9A is a diagram showing the contents of plural charge completion information-designating communication.

FIG. 9B is a diagram showing the contents of plural slave charge completion information communication.

FIG. 9C is a diagram showing the contents of all slave charge completion information communication.

FIG. 18A is a diagram showing a plural charge completion information-incompatible strobe model table.

FIG. 18B is a diagram showing a plural charge completion information-incompatible camera model table.

FIG. 19A is a diagram showing the contents of model information communication between the camera and the external strobe device.

FIG. 19B is a diagram showing the contents of master charge completion information communication.

FIG. 23 is a diagram useful in explaining master and slave charge completion information communication.

FIG. 25 is a diagram useful in explaining master & slave charge completion information communication.

DESCRIPTION OF THE EMBODIMENTS

The present invention will now be described in detail below with reference to the accompanying drawings showing embodiments thereof.

Figure 1:
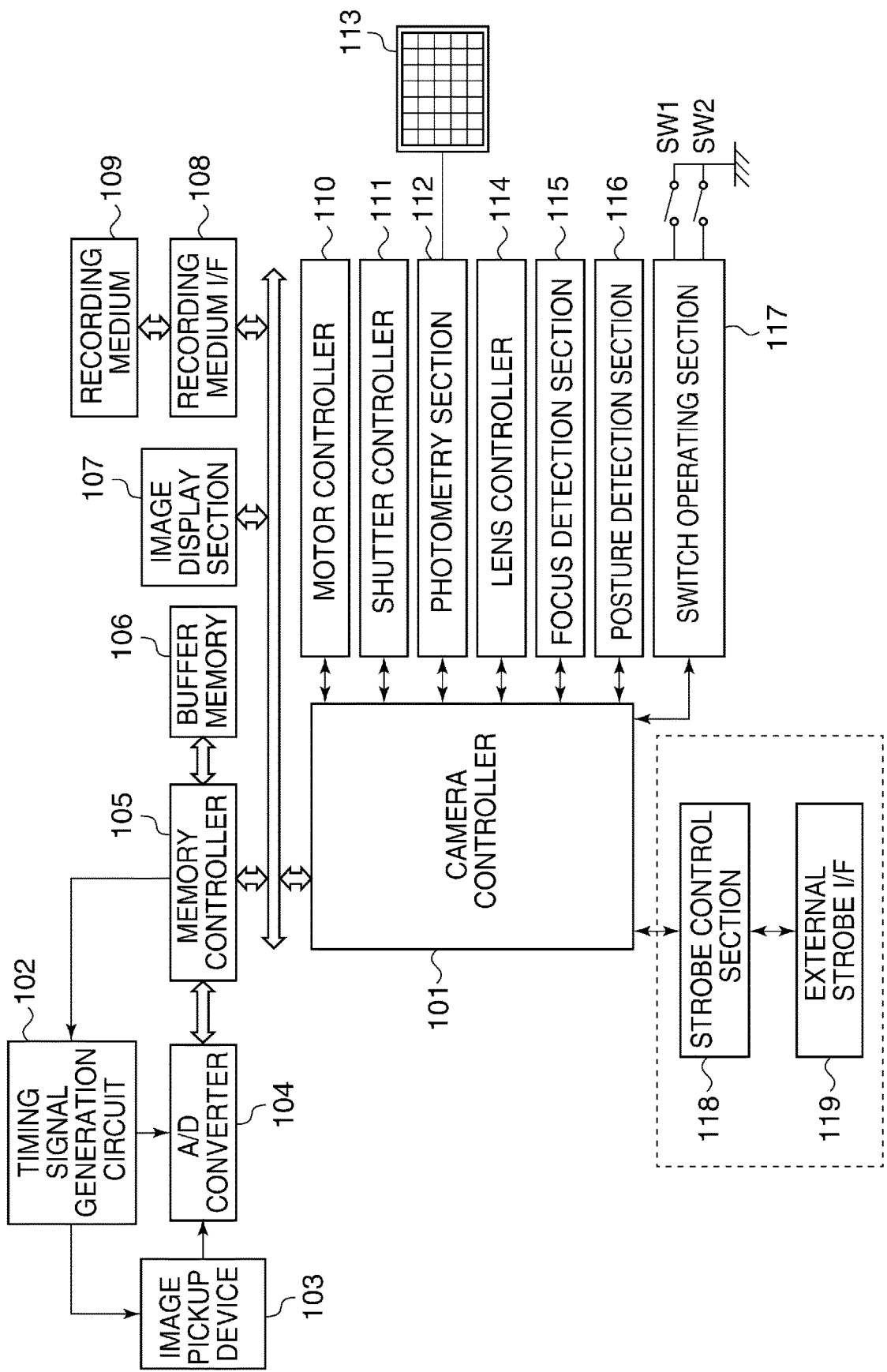
FIG. 1 is a block diagram of a digital camera.
Figure 2:
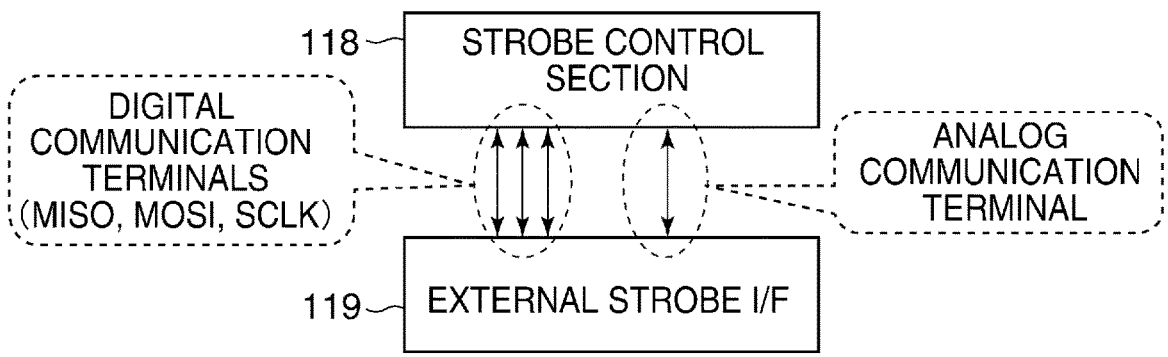
FIG. 2 is a block diagram useful in explaining a connection signal exchanged between an external strobe interface and a strobe control section of the digital camera shown in FIG. 1.
Figure 3:
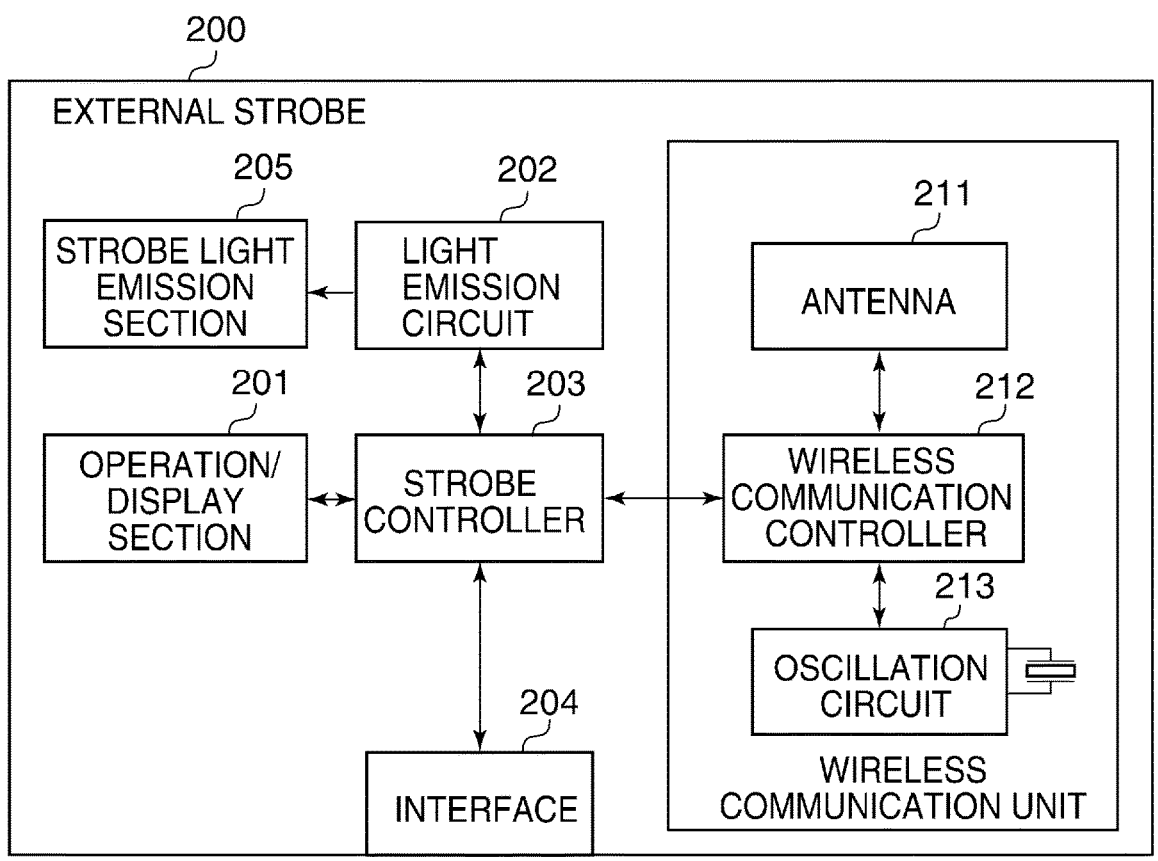
FIG. 3 is a block diagram of an external strobe device as a lighting device according to a first embodiment of the present invention, which is attached to the digital camera shown in FIG. 1.

FIG. 1 is a block diagram of a digital camera. FIG. 2 is a block diagram useful in explaining a connection signal exchanged between an external strobe interface 119 and a strobe control section 118 of the digital camera shown in FIG. 1. FIG. 3 is a block diagram of an external strobe device 200 which is attached to the digital camera shown in FIG. 1. Here, the digital camera corresponds to an example of an image pickup apparatus of the present invention, and the external strobe device 200 (hereinafter referred to as the external strobe 200) corresponds to an example of a lighting device of the present invention.

First, the configuration of the digital camera (hereinafter referred to as the camera) will be described with reference to FIG. 1. Referring to FIG. 1, a camera controller 101 is comprised of a CPU, a RAM, a ROM, etc., none of which are shown, and performs the overall system control of the camera, such as a photographing sequence. An image pickup device 103 is implemented by a CCD sensor or a CMOS sensor or the like, and converts an optical image formed thereon by a light flux reflected from an object through a lens unit, not shown, into electric signals. A timing signal generation circuit 102 generates a timing signal necessary for operating the image pickup device 103. An analog-to-digital converter 104 converts analog image data read from the image pickup device 103 to digital image data. A memory controller 105 controls operations for writing and reading data into and from a memory, not shown, an operation for refreshing a buffer memory 106, and so forth.

An image display section 107 displays image data stored in the buffer memory 106. A recording medium interface 108 is an interface for connection with a recording medium 109. The recording medium 109 is implemented by a memory card, a hard disk, or the like. A motor controller 110 controls a motor, not shown, according to signals delivered from the camera controller 101 to move a mirror, not shown, up and down, and charge a shutter, not shown, for an exposure operation. A shutter controller 111 controls the exposure operation by cutting supply of electric power to a shutter front curtain and a shutter rear curtain, neither of which is shown, to cause the curtains to travel according to signals delivered from the camera controller 101.

As a luminance signal of each area in a screen, a photometry section 112 outputs an output from a multi-segment photometric sensor 113, which divides the screen into a plurality of areas, to the camera controller 101. The camera controller 101 converts the luminance signal using an analog-to-digital converter, not shown, and performs photometric calculation for adjusting the exposure in photographing, such as calculation of AV (aperture value), TV (shutter speed), ISO (sensitivity of the image pickup device), etc. Further, the photometry section 112 outputs luminance signals obtained by preliminary light emission toward an object, from the external strobe 200, to the camera controller 101, and the camera controller 101 also calculates a strobe main light emission amount for exposure, based on the received luminance signals.

A lens controller 114 causes the lens unit and the camera controller 101 to communicate with each other via a lens mount contact, not shown, and causes a lens drive motor and a lens diaphragm motor, neither of which is shown, to operate to thereby perform lens focus adjustment control and aperture control A focus detection section 115 has a function of detecting a defocus amount for AF (auto focus) on an object. A posture detection section 116 detects a tilt of the camera with respect to a gravity direction and a direction of rotation about an optical axis.

A release switch SW1 is turned on when a release button, not shown, is pressed to move through a first stroke, to thereby cause the camera controller 101 to start AF and photometry operations. A release switch SW2 is turned on when the release button is pressed to move through a second stroke, to thereby cause the camera controller 101 to start an exposure operation. Signals output from the release switches SW1 and SW2, and other operating members of the camera, none of which are specifically shown, are detected by a switch operating section 117, and the switch operating section 117 sends detection signals to the camera controller 101. The strobe control section 118 performs light emission processing, such as processing for instructing a light emission pattern (instructing preliminary light emission or main light emission) and a main light emission amount. The external strobe interface 119 is connected to the strobe control section 118, and communication with the external strobe 200 is performed via the external strobe interface 119.

Here, the connection signal exchanged between the external strobe interface 119 and the strobe control section 118 will be described with reference to FIG. 2. As shown in FIG. 2, the external strobe interface 119 and the strobe control section 118 are connected by a total of four connection lines: three digital communication lines (MISO, MOSI, and SCLK) and one analog signal (voltage) line. When charging of the external strobe 200 is completed, the analog signal line except a ground signal line changes its signal level from Hi to Low, and when the Low signal is detected by the strobe control section 118, completion of charging is detected.

Next, the configuration of the external strobe 200 will be described with reference to FIG. 3. Here, in the present embodiment, the external strobe 200 is defined as a master strobe, and a desired number of slave strobes, not shown, are connected to the master strobe in a state capable of performing wireless communication therewith. The master strobe and the slave strobes are synchronously driven by an instruction from the camera controller 101.

Referring to FIG. 3, a strobe controller 203 is comprised of a CPU, a RAM, a ROM, and so forth, none of which are shown, and controls the overall operation of the external strobe 200. For example, the strobe controller 203 receives a light emission instruction or the like from the camera via an interface 204, and further transmits various setting information of the external strobe 200 to the camera. Further, the strobe controller 203 acquires charge completion information of the slave strobes via communication with a wireless communication controller 212, and notifies the camera of the acquired information.

A strobe light emission section 205 is formed by a xenon tube and a reflection umbrella, neither of which is shown. A light emission circuit 202 starts and stops strobe emission according to an instruction from the strobe controller 203. Further, the light emission circuit 202 includes a capacitor for light emission and a circuit for charging the capacitor, neither of which is shown, and notifies the strobe controller 203 of the charged state. An operation/display section 201 notifies the strobe controller 203 of operation information of operating members, not shown, formed by buttons and switches, and further, displays various information items based on information received from the strobe controller 203.

The interface 204 is comprised of a digital communication section and an analog communication section (based on voltage or electric current), neither of which is shown, and information is exchanged with the camera via the interface 204. An antenna 211 is an antenna for wireless communication. The wireless communication controller 212 outputs an instruction and information to the slave strobes by wireless communication according to an instruction from the strobe controller 203. Further, the wireless communication controller 212 notifies the strobe controller 203 of information (charge completion information, etc.) received from the slave strobes. An oscillation circuit 213 is a circuit for controlling wireless communication. The antenna 211, the wireless communication controller 212, and the oscillation circuit 213 form a wireless communication unit. Note that in the following description, the master strobe and the slave strobes are sometimes generically simply referred to as the strobe.

Figure 4:
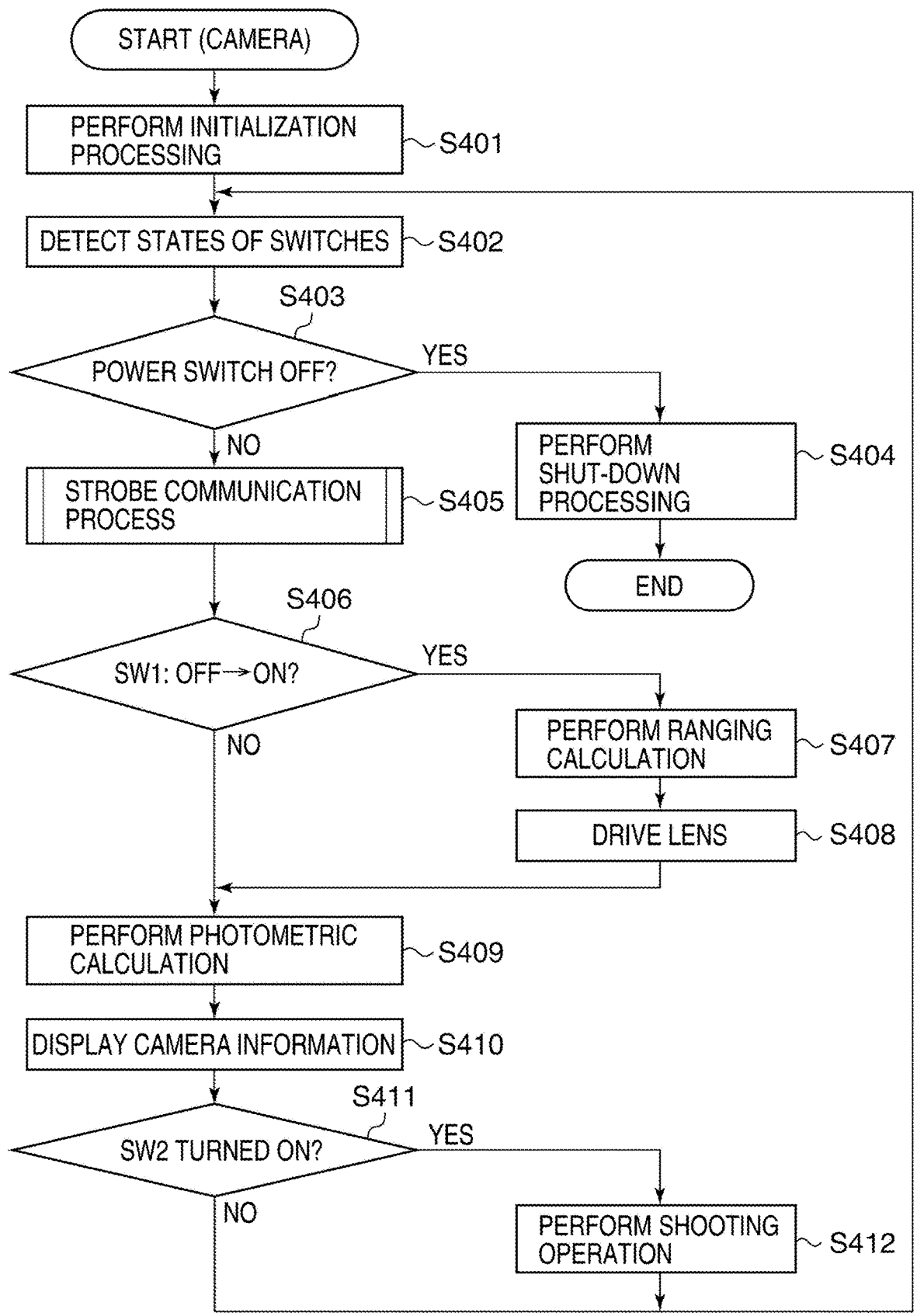
FIG. 4 is a flowchart of a photographing control process of the camera.

Next, the operation of the camera will be described with reference to FIGS. 4 to 10B. FIG. 4 is a flowchart of a photographing control process of the camera. Processing operations in steps in FIG. 4 are performed by the CPU of the camera controller 101 executing an associated program stored in the ROM or the like of the camera controller 101 and loaded into the RAM of the same.

Referring to FIG. 4, in a step S401, the camera controller 101 performs initialization processing, such as initialization of a register, initialization of data, and initialization of peripherals, and proceeds to a step S402. Note that initialization of data includes initialization of information stored in the RAM, such as a charge completion flag, a charge completion flag of the master strobe (master charge completion flag), and a charge completion flag of a slave strobe (slave charge completion flag). In the step S402, the camera controller 101 detects states of the release switches SW1 and SW2, and the other operating members of the camera, not shown, based on the detection signals output from the switch operating section 117, and proceeds to a step S403.

In the step S403, the camera controller 101 determines whether or not a power switch, not shown, has been turned off, and if the power switch is on, the camera controller 101 proceeds to a step S405, whereas if the power switch has been turned off, the camera controller 101 proceeds to a step S404. In the step S404, the camera controller 101 performs shut-down processing, including sending a power-off instruction to the peripheral components, and saving data, followed by terminating the present process. In the step S405, the camera controller 101 performs a strobe communication process with the external strobe 200 connected thereto to transmit various information of the camera, and receives various information of the external strobe 200, and then proceeds to a step S406. Note that the strobe communication process will be described in detail hereinafter with reference to FIG. 5.

In the step S406, the camera controller 101 determines whether or not the state of the release switch SW1 has been changed from an off state to an on state, and if the state of the release switch SW1 has been changed, the camera controller 101 proceeds to a step S407, whereas if not, the camera controller 101 proceeds to a step S409. In the step S407, the camera controller 101 performs ranging calculation by a well-known phase difference detection method based on a defocus amount sent from the focus detection section 115, and proceeds to a step S408. In the step S408, the camera controller 101 calculates a lens driving amount based on the data obtained by the above-mentioned ranging calculation, causes the lens controller 114 to drive the lens of the lens unit to perform a focusing operation, and proceeds to the step S409.

In the step S409, the camera controller 101 performs photometric calculation for determining a shutter speed (CMOS charge accumulation time), an aperture value, and so forth, based on an output from the photometry section 112, and camera setting information, such as an ISO sensitivity and a photographing mode, which are currently set, and proceeds to a step S410. In the step S410, the camera controller 101 displays camera information, such as the shutter speed and the aperture value, which have been determined by the photometric calculation and the like, and the charge completion information of the strobe, on the image display section 107 or an information display section 107a (see FIG. 10A) within a viewfinder, not shown, and proceeds to a step S411.

Figure 10A:
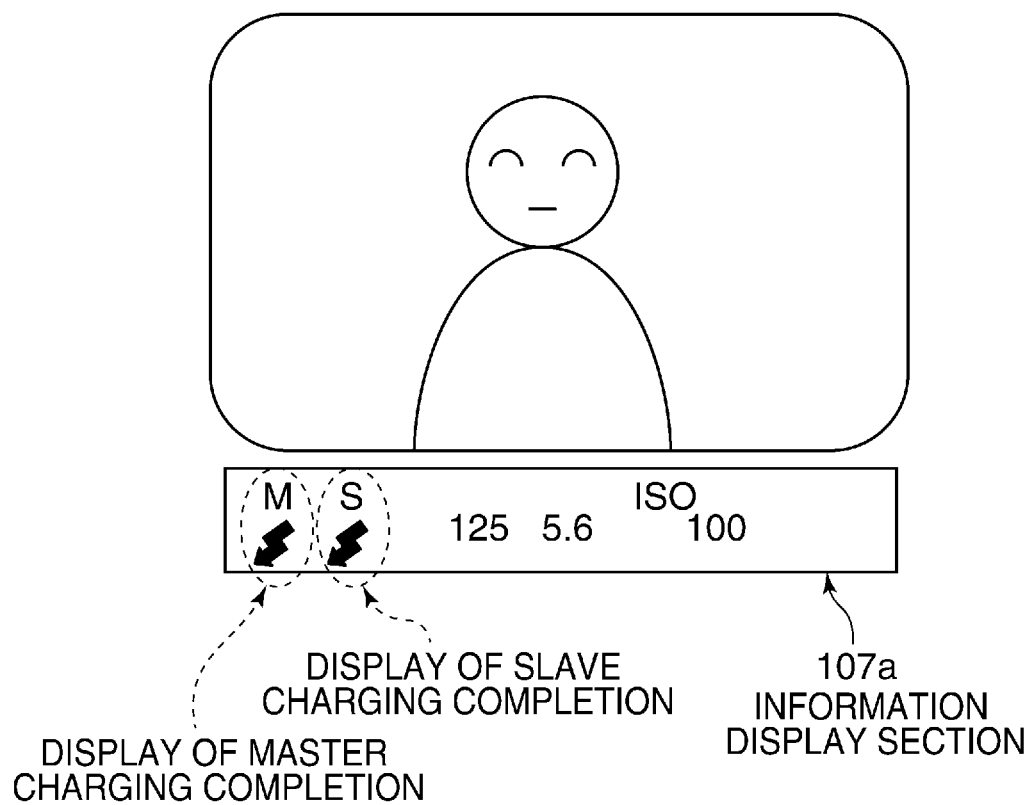
FIG. 10A is a diagram showing an example of the display within a viewfinder including an information display section.

Here, an example of the display on the information display section 107a will be described with reference to FIG. 10A. As shown in FIG. 10A, various information items of the camera are displayed on the information display section 107a, and in a case where the master charge completion flag, referred to hereinafter, is equal to 1, a lightning mark below "M" is displayed, whereas in a case where the master charge completion flag is equal to 0, the lightning mark is not displayed. Further, in a case where the slave charge completion flag, referred to hereinafter, is equal to 1, a lightning mark below "S" is displayed, whereas in a case where the slave charge completion flag is equal to 0, the lightning mark is not displayed.

Figure 10B:
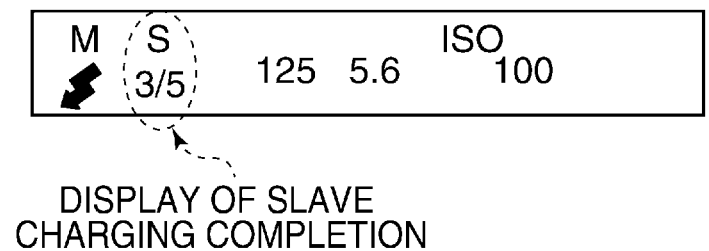
FIG. 10B is a diagram showing another example of the display of the information display section.

Further, in the case of single charge completion information, referred to hereinafter, if the charge completion flag is equal to 1, although "M" is not displayed, the lightning mark below "M" is displayed, whereas if the charge completion flag is equal to 0, the lightning mark is not displayed. Note that as shown in FIG. 10B, the charge completion information of the slave strobes can be displayed on the information display section 107a in the form of a faction by setting the numerator to the number of completely charged slave strobes, and the dominator to the total number of slave strobes.

In the step S411, the camera controller 101 determines whether or not the release switch SW2 is on, and if the release switch SW2 is on, the camera controller 101 proceeds to a step S412, whereas if not, the camera controller 101 returns to the step S402. In the step S412, the camera controller 101 performs well-known operations of the image pickup device 103, such as gain setting, charge accumulation operation, and read-out operation, and operations for still image photographing, such as image processing and image writing, and returns to the step S402.

Next, the strobe communication process in the step S405 in FIG. 4 will be described with reference to FIG. 5.

Figure 5:
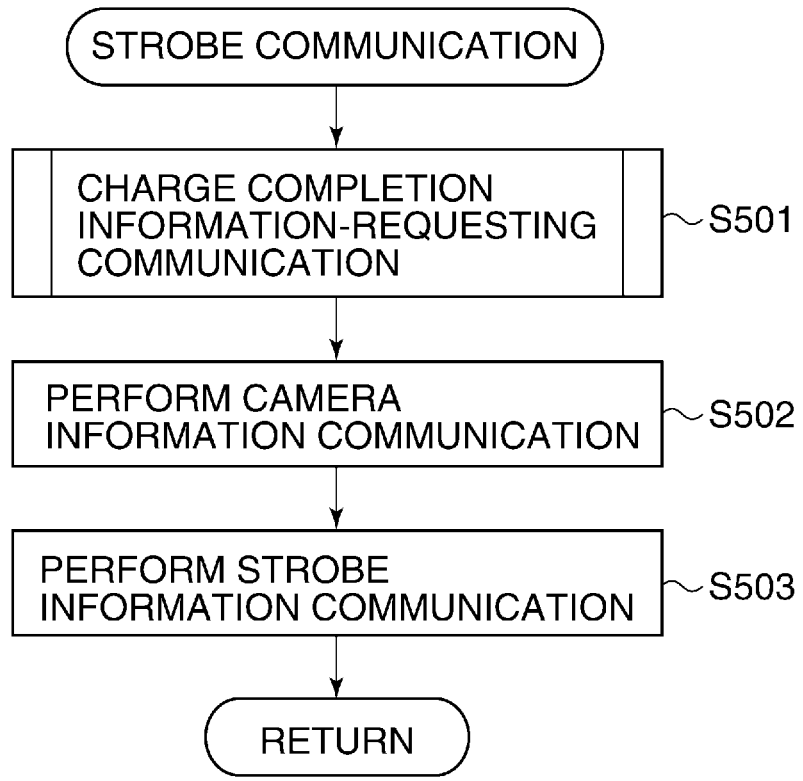
FIG. 5 is a flowchart of a strobe communication process performed in a step in FIG. 4.

Referring to FIG. 5, in a step S501, the camera controller 101 performs charge completion information-requesting communication with the external strobe 200 to acquire strobe charge completion information, and proceeds to a step S502. The charge completion information-requesting communication in the step S501 will be described in detail hereinafter with reference to FIGS. 6 to 9C. In the step S502, the camera controller 101 transmits various setting information (TV, AV, ISO, a photographing mode, and so forth) of the camera to the external strobe 200, and then proceeds to a step S503. In the step S503, the camera controller 101 requests the external strobe 200 to send various information of the strobe (such as a strobe mode), and then returns after receiving the various information.

Next, the charge completion information-requesting communication process in the step S501 in FIG. 5 will be described with reference to FIG. 6.

Figure 6:
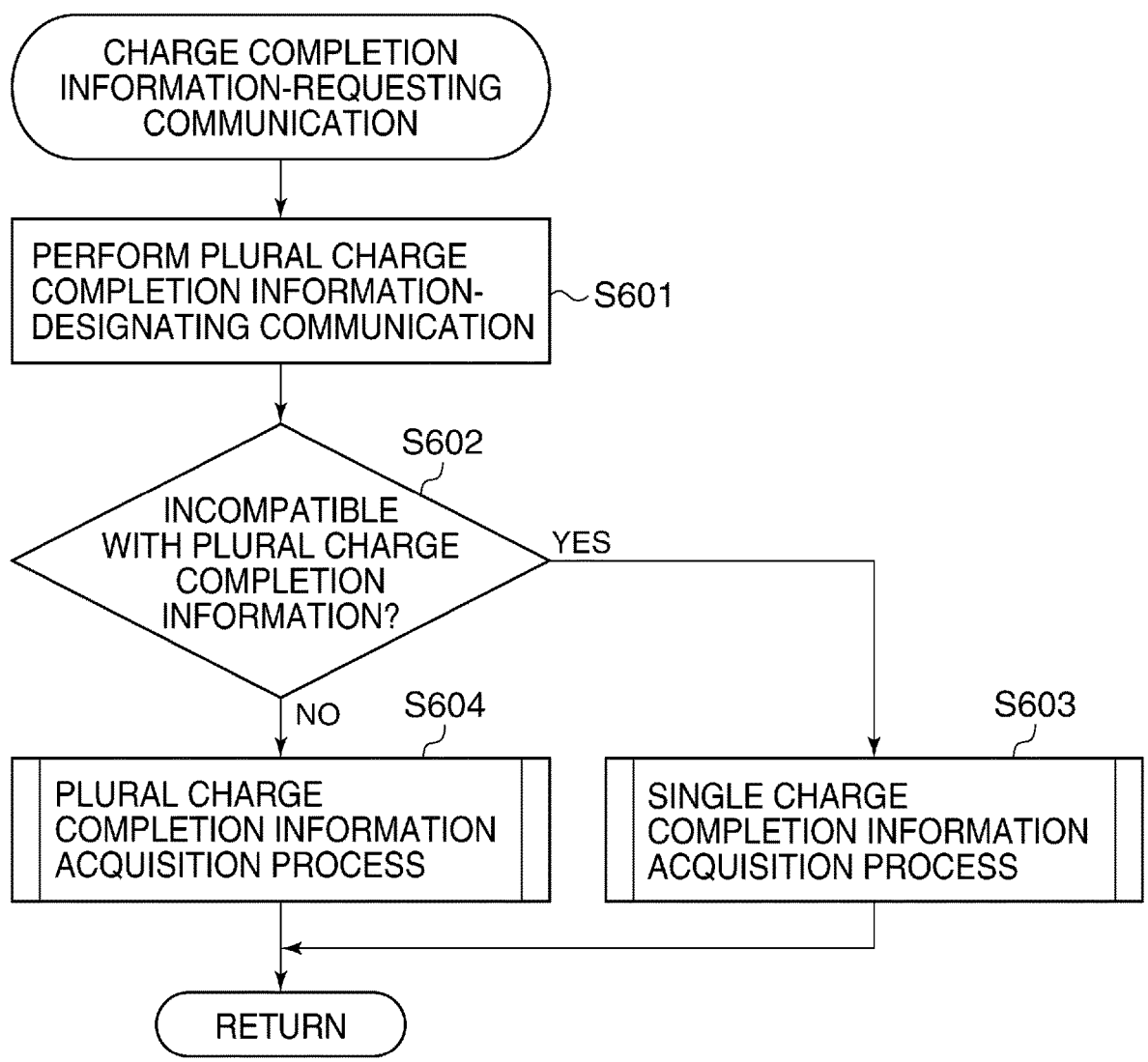
FIG. 6 is a flowchart of a charge completion information-requesting communication process performed in a step in FIG. 5.

Referring to FIG. 6, in a step S601, the camera controller 101 performs plural charge completion information-designating communication with the external strobe 200, and proceeds to a step S602. At this time, the external strobe 200 receives designating information by the plural charge completion information-designating communication, and transmits information indicative of whether or not the external strobe 200 is compatible with the plural charge completion information, to the camera.

FIG. 9A is a diagram showing the contents of the plural charge completion information-designating communication. Referring to FIG. 9A, when data "40" is transmitted from the camera, if the external strobe 200 is incompatible with the plural charge completion information, the external strobe 200 inputs 0 as DATA 1 (plural charge completion information flag), and transmits the DATA 1 to the camera, whereas if the external strobe 200 is compatible with the plural charge completion information, the external strobe 200 inputs 1 as the DATA 1, and transmits the DATA 1 to the camera.

In the step S602, the camera controller 101 determines, based on the plural charge completion information-designating communication in the step S601, whether or not the external strobe 200 is incompatible with the plural charge completion information. Then, if the external strobe 200 is incompatible with the plural charge completion information, the camera controller 101 proceeds to a step S603 to perform a single charge completion information acquisition process, whereas if the external strobe 200 is compatible with the plural charge completion information, the camera controller 101 proceeds to a step S604a to perform a plural charge completion information acquisition process. The single charge completion information acquisition process in the step S603 will be described in detail hereinafter with reference to FIG. 7. Further, the plural charge completion information acquisition process in the step S604 will be described in detail hereinafter with reference to FIG. 8.

Next, the single charge completion information acquisition process in the step S603 in FIG. 6 will be described with reference to FIG. 7.

Figure 7:
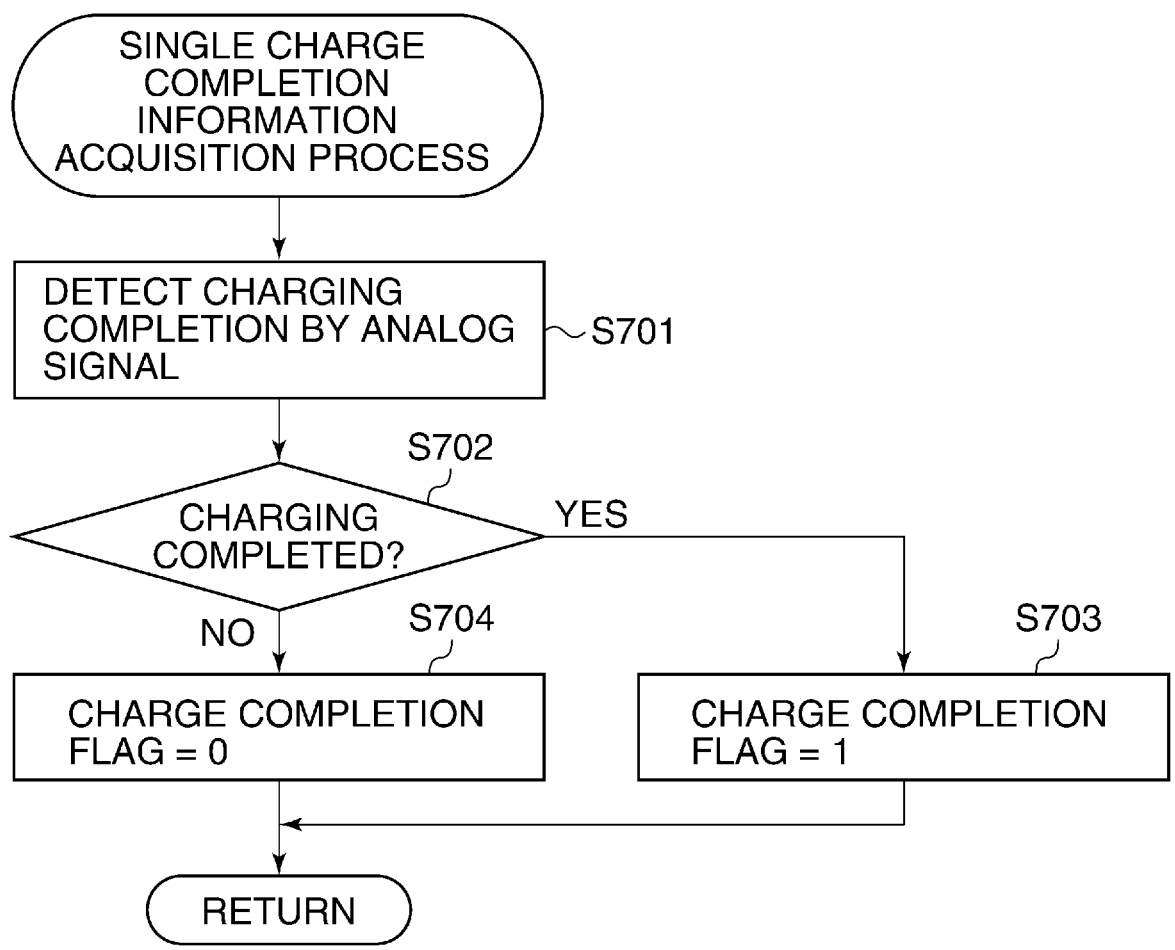
FIG. 7 is a flowchart of a single charge completion information acquisition process performed in a step in FIG. 6.

Referring to FIG. 7, in a step S701, the camera controller 101 communicates with the strobe control section 118 to acquire the charge completion information of the external strobe 200 by detecting an analog signal indicative of (Hi/Low of) a voltage (or electric current) of the connection terminal, and proceeds to a step S702. If it is determined in the step S702 that the charging of the external strobe 200 is completed, based on the result of detection indicated by the analog signal in the step S701, the camera controller 101 proceeds to a step S703, whereas if not, the camera controller 101 proceeds to a step S704.

In the step S703, the camera controller 101 sets the charge completion flag, stored in the RAM, to 1, and returns. In the step S704, the camera controller 101 sets the charge completion flag, stored in the RAM, to 0, and returns. When the charge completion flag is equal to 1, the camera controller 101 determines that the external strobe 200 has been completely charged, and performs the strobe control.

Next, the plural charge completion information acquisition process in the step S604 in FIG. 6 will be described with reference to FIG. 8.

Figure 8:
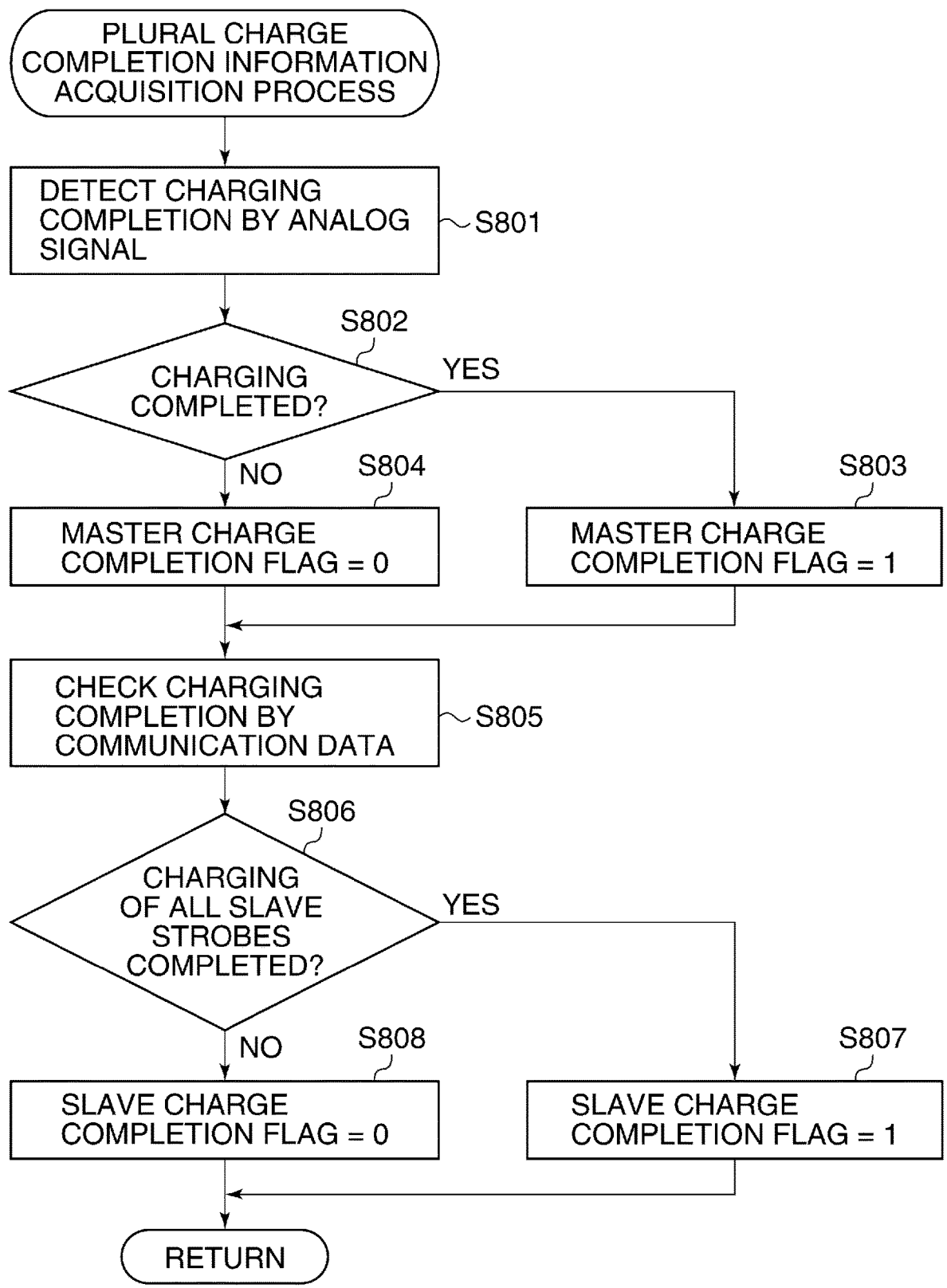
FIG. 8 is a flowchart of a plural charge completion information acquisition process performed in a step in FIG. 6.

Referring to FIG. 8, in a step S801, the camera controller 101 communicates with the strobe control section 118 to detect the analog signal indicative of (Hi/Low of) the voltage (or electric current) of the connection terminal for acquisition of the master charge completion information (charge completion information of the master strobe) of the external strobe 200, and proceeds to a step S802. If it is determined in the step S802 that the charging of the master strobe is completed (Low), based on the result of detection indicated by the analog signal in the step S801, the camera controller 101 proceeds to a step S803, whereas if not (Hi), the camera controller 101 proceeds to a step S804.

In the step S803, the camera controller 101 sets the master charge completion flag, stored in the RAM, to 1, and proceeds to a step S805. In the step S804, the camera controller 101 sets the master charge completion flag, stored in the RAM, to 0, and proceeds to the step S805.

In the step S805, the camera controller 101 performs slave charge completion information communication (communication for charge completion information of the slave strobes) with the external strobe 200 via the strobe control section 118 using the digital communication terminals appearing in FIG. 2, to receive the charge completion information of the plurality of slave strobes, and proceeds to a step S806.

FIG. 9B is a diagram showing the contents of plural slave charge completion information communication as an example of the slave charge completion information communication. Referring to FIG. 9B, the plural slave charge completion information communication is performed by 4-byte communication. When data "50" is transmitted from the camera to the external strobe 200, the external strobe 200 transmits the plural slave charge completion information to the camera. At this time, the external strobe 200 transmits the slave information (DATA 1 to DATA 3) of the second to fourth bytes of the data to the camera.

The DATA 1 indicates the number of slave strobes which are communicably connected to the external strobe 200 which is the master strobe, and is set to one of values of 0 to 16. The DATA 2 and the DATA 3 indicate the charge completion information of the respective slave strobes, and are formed by bits for 16 strobes. When the bit is equal to 1, this indicates that charging of the corresponding strobe is completed, and when the bit is equal to 0, this indicates that charging of the corresponding strobe is not completed. Although in the present embodiment, the number of connectable slave strobes is 16, it is possible to reduce the number of connectable slave strobes to thereby reduce the amount of communication, or increase the number of connectable slave strobes to thereby increase the amount of communication.

FIG. 9C is a diagram showing the contents of all slave charge completion information communication as another example of the slave charge completion information communication. Referring to FIG. 9C, when data "51" of the first byte is transmitted from the camera to the external strobe 200, the external strobe 200 transmits the slave charge completion information as data of the second byte (DATA 1) to the camera. The DATA 1 indicates all slave charge completion information (charge completion information of all slave strobes), and when the DATA 1 indicates 0, this indicates that charging of all slave strobes is not completed, when the DATA 1 indicates 1, this indicates that charging of all slave strobes is completed, and when the DATA 1 indicates 3, this indicates that no slave strobe is connected.

Further, even when both of the plural slave charge completion information communication, shown in FIG. 9B, and the all slave charge completion information communication, shown in FIG. 9C, are used together, there is no problem on the system, and in a case where charging of all slave strobes is completed, the all slave charge completion information communication is more advantageous because the all slave charge completion information communication uses a less number of bytes for communication.

If it is determined in the step S806 that the charging of all slave strobes is completed, the camera controller 101 proceeds to a step S807, whereas if not, the camera controller 101 proceeds to a step S808. In the step S807, the camera controller 101 sets the slave charge completion flag, stored in the RAM, to 1, and returns. In the step S808, the camera controller 101 sets the slave charge completion flag, stored in the RAM, to 0, and returns.

Figure 11:
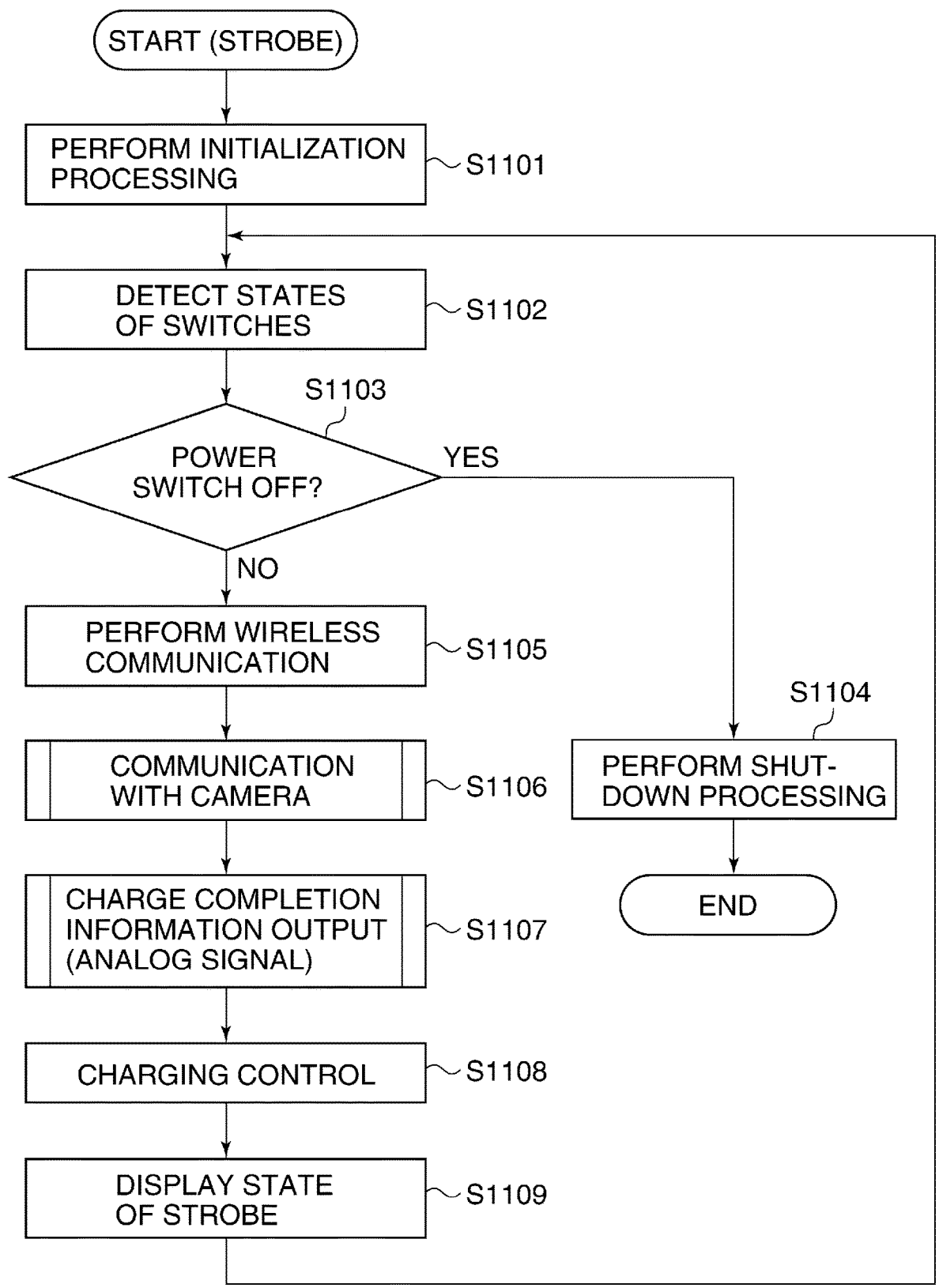
FIG. 11 is a flowchart of a control process of an external strobe device.

Next, the operation of the external strobe 200 will be described with reference to FIGS. 11 to 13. FIG. 11 is a flowchart of a control process of the external strobe 200. Processing operations in steps in FIG. 11 are performed by the CPU of the strobe controller 203 executing an associated program stored in the ROM or the like of the strobe controller 203 and loaded into the RAM of the same.

Referring to FIG. 11, in a step S1101, the strobe controller 203 performs initialization processing including initialization of data (plural charge completion information flag, etc.) stored in the RAM, and proceeds to a step S1102. In the step S1102, the strobe controller 203 detects states of the switches (including a power switch) of the operation/display section 201, and proceeds to a step S1103. If it is determined in the step S1103 that the power switch has been turned off based on the states of the switches detected in the step S1102, the strobe controller 203 proceeds to a step S1104, whereas if the power switch is on, the strobe controller 203 proceeds to a step S1105. In the step S1104, the strobe controller 203 performs shut-down processing, such as power-off processing, and terminates the strobe operation.

In the step S1105, the strobe controller 203 communicates with the wireless communication controller 212 to receive various settings of wireless communication and the information (including the slave charge completion information) received from the slave strobes, and proceeds to a step S1106. In the step S1106, the strobe controller 203 communicates with the camera via the interface 204, and proceeds to a step S1107. Note that the process for communication with the camera in the step S1106 will be described in detail hereinafter with reference to FIG. 12.

In the step S1107, the strobe controller 203 outputs the charge completion information of the external strobe 200 (master strobe) itself to the camera as an analog signal, and proceeds to a step S1108. Note that the charge completion information (analog signal) output process in the step S1107 will be described hereinafter with reference to FIG. 13.

In the step S1108, the strobe controller 203 performs charging control for starting and stopping charging of the capacitor of the external strobe 200, and proceeds to a step S1109. In the step S1109, the strobe controller 203 displays the states of the external strobe 200 (a strobe mode, a charged state, a zoom position, etc.) on the operation/display section 201, and returns to the step S1102.

Next, the process for communication with the camera in the step S1106 in FIG. 11 will be described with reference to FIG. 12. Here, it is assumed that the external strobe 200 is compatible with the plural charge completion information described with reference to FIG. 9A.

Figure 12:
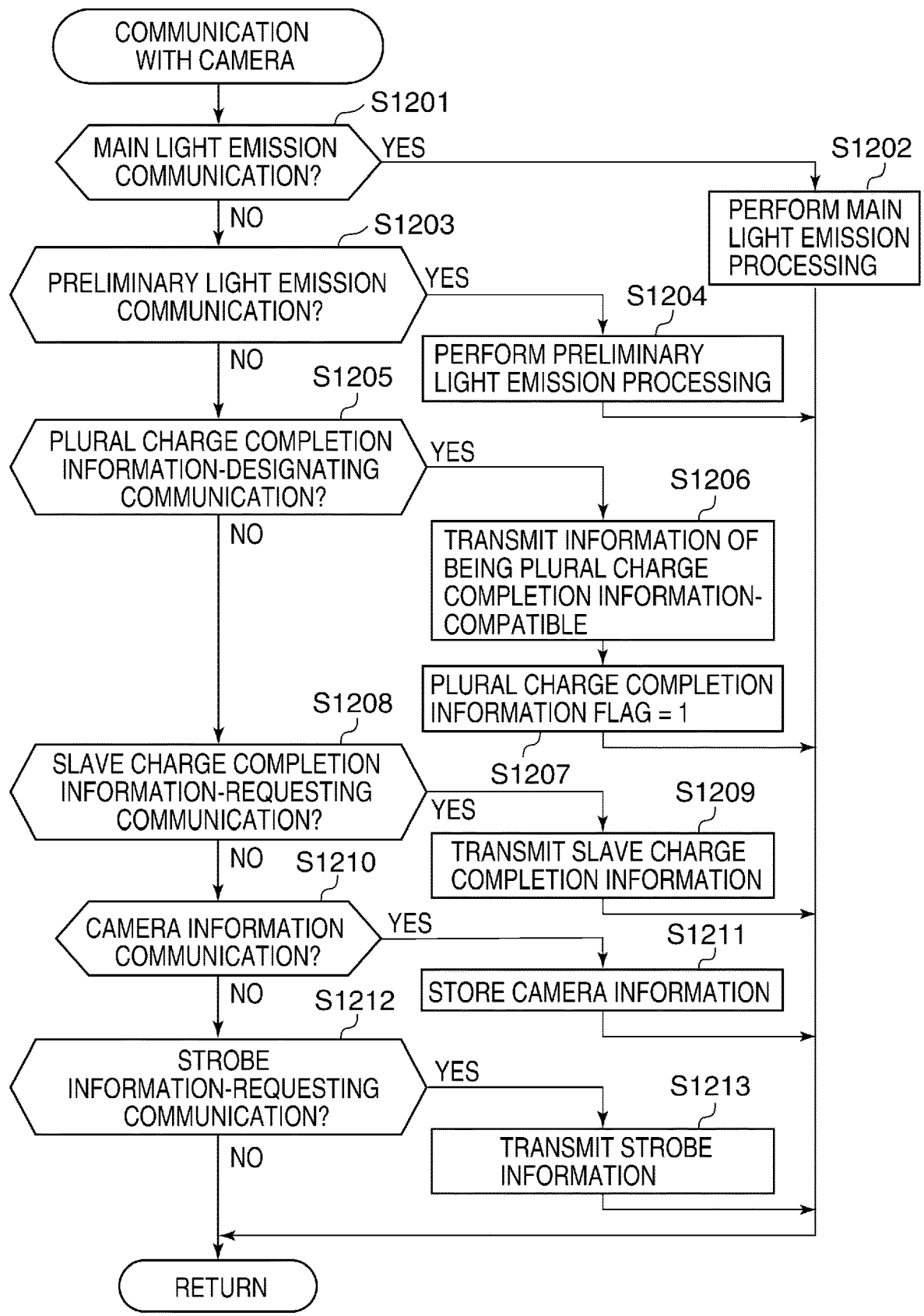
FIG. 12 is a flowchart of a process performed in a step in FIG. 11, for communication with the camera.

Referring to FIG. 12, if it is determined in a step S1201 that the communication from the camera is main light emission communication, the strobe controller 203 proceeds to a step S1202, whereas if not, the strobe controller 203 proceeds to a step S1203. In the step S1202, the strobe controller 203 performs main light emission processing, and returns. If it is determined in the step S1203 that the communication from the camera communicates is preliminary light emission communication, the strobe controller 203 proceeds to a step S1204, whereas if not, the strobe controller 203 proceeds to a step S1205. In the step S1204, the strobe controller 203 performs preliminary light emission processing including storing preliminary light emission information, such as an amount of preliminary light emission, in the RAM, and returns.

If it is determined in the step S1205 that the communication from the camera is the plural charge completion information-designating communication, the strobe controller 203 proceeds to a step S1206, whereas if not, the strobe controller 203 proceeds to a step S1208. In the step S1206, the strobe controller 203 transmits data indicating that the external strobe 200 is compatible with the plural charge completion information to the camera (since the external strobe 200 is assumed to be compatible with the plural charge completion information, as mentioned above), and proceeds to a step S1207. In the step S1207, the strobe controller 203 sets the plural charge completion information flag (DATA 1 in FIG. 9A) to 1, and returns. Here, the plural charge completion information flag stored in the RAM is set to 1 to thereby indicate that the plurality of strobe charge completion information items are to be transmitted to the camera.

If it is determined in the step S1208 that the communication from the camera is slave charge completion information-requesting communication, the strobe controller 203 proceeds to a step S1209, whereas if not, the strobe controller 203 proceeds to a step S1210. In the step S1209, the strobe controller 203 transmits the slave charge completion information (e.g. the slave information (DATA 1 to DATA 3) of the plural slave charge completion information in FIG. 9B) to the camera as the digital information, and returns.

If it is determined in the step S1210 that the communication from the camera is camera information communication, the strobe controller 203 proceeds to a step S1211, whereas if not, the strobe controller 203 proceeds to a step S1212. In the step S1211, the strobe controller 203 receives the camera information (a photographing mode, a shutter speed, an aperture, a zoom position, preliminary light emission information, etc.) from the camera, stores the received information in the RAM, and returns.

If it is determined in the step S1212 that the communication from the camera is strobe information-requesting communication, the strobe controller 203 proceeds to a step S1213, whereas if not, the strobe controller 203 returns. In the step S1213, the strobe controller 203 transmits the strobe information (a strobe mode, battery information, guide number information, etc.) to the camera, and returns.

Next, the charge completion information (analog signal) output process in the step S1107 in FIG. 11 will be described with reference to FIG. 13.

Figure 13:
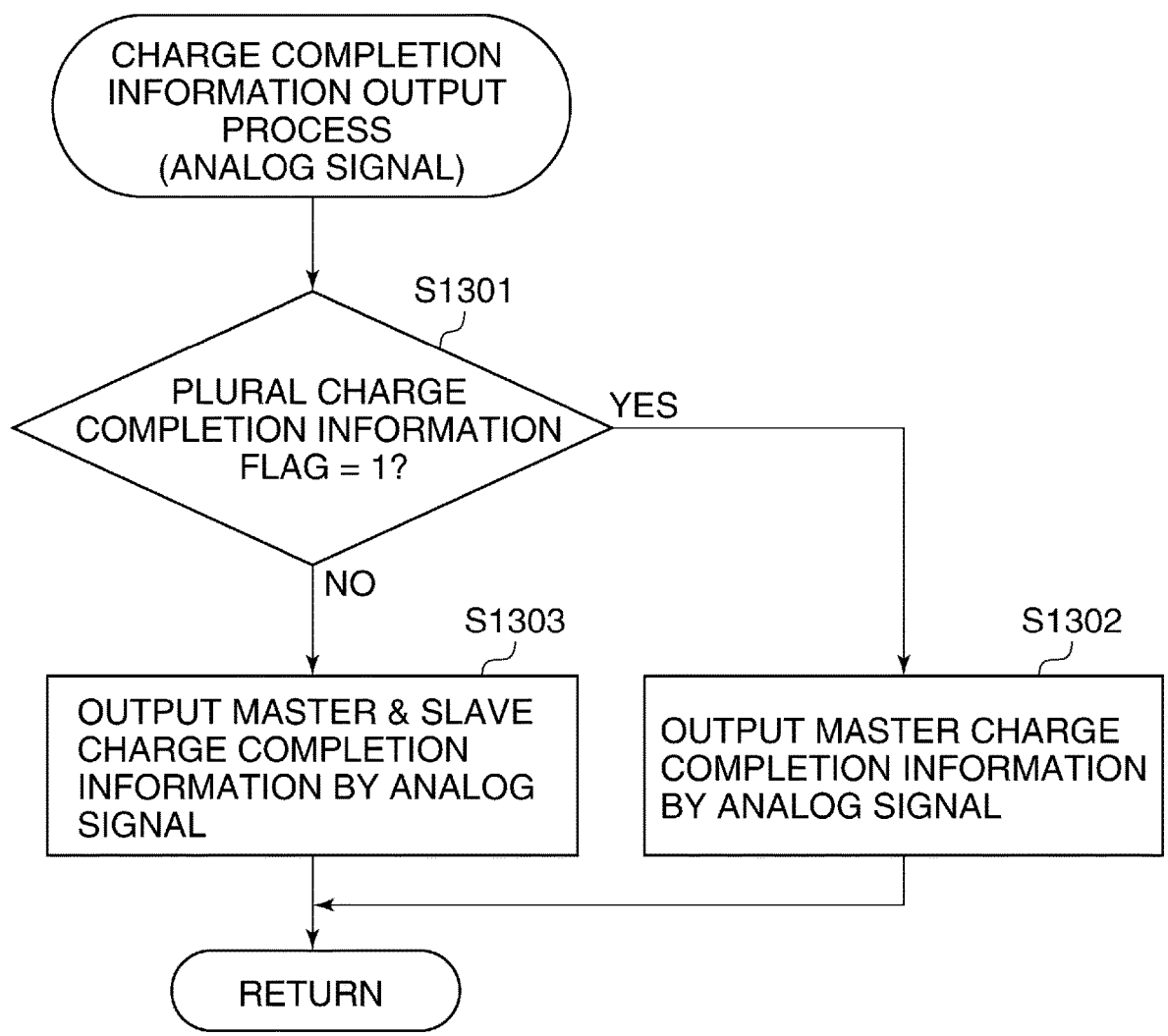
FIG. 13 is a flowchart of a charge completion information (analog signal) output process performed in a step in FIG. 11.

Referring to FIG. 13, if it is determined in a step S1301 that the plural charge completion information flag is equal to 1, the strobe controller 203 proceeds to a step S1302, whereas if not, the strobe controller 203 proceeds to a step S1303. In the step S1302, as a plural charge completion information-compatible output, the strobe controller 203 delivers an analog signal indicative of the master charge completion information to the camera, and returns. Here, if the charging of the master strobe is completed, the analog signal is set to Low, whereas if the charging of the master strobe is not completed, the analog signal is set to Hi.

In the step S1303, as the plural charge completion information-incompatible output, the strobe controller 203 delivers an analog signal indicative of the master charge completion information and the slave charge completion information to the camera, and returns. Here, if the charging of both of the master strobe and the slave strobe is completed, the analog signal is set to Low, whereas if not, the analog signal is set to Hi.

As described above, in the present embodiment, when the camera transmits the designating information to the external strobe 200 by the plural charge completion information-designating communication, the external strobe 200 is enabled to notify the camera of the master charge completion information by the output of the analog signal and of the slave charge completion information by digital communication. This enables the camera to separately know the master charge completion information and the slave charge completion information using the analog information and the digital information, respectively. Further, in a case where the plural charge completion information-designating communication from the camera does not occur, both of the master charge completion information and the slave charge completion information are output as the analog signal. With this, even when there are a plurality of strobe charge completion information items to be notified in the multi-light control, it is possible to notify the camera of the plurality of strobe charge completion information items.

Although in the present embodiment, the strobe charge completion information is switched to the plural strobe charge completion information according to the designating information by the plural charge completion information-designating communication from the camera to the external strobe 200, this is not limitative. For example, instead of this, the strobe charge completion information may be switched to the plural strobe charge completion information by the camera notifying the external strobe 200 of information indicating that the camera is compatible with the plural charge completion information as the camera information, and the external strobe 200, upon receipt of the camera information, notifying the camera that the external strobe 200 is compatible with the plural charge completion information.

Further, although in the present embodiment, in a case where the plural charge completion information-designating communication from the camera does not occur, the external strobe 200 outputs the master charge completion information and the slave charge completion information as the analog signal, the external strobe 200 may output only the master charge completion information as the analog signal.

Next, a description will be given of an external strobe as a lighting device according to a second embodiment of the present invention with reference to FIGS. 14 to 19, etc. The following description is given of mainly of different points of the present embodiment from the first embodiment, while denoting components identical or corresponding to those of the first embodiment by the same reference numerals and referring to the same figures.

Figure 14:
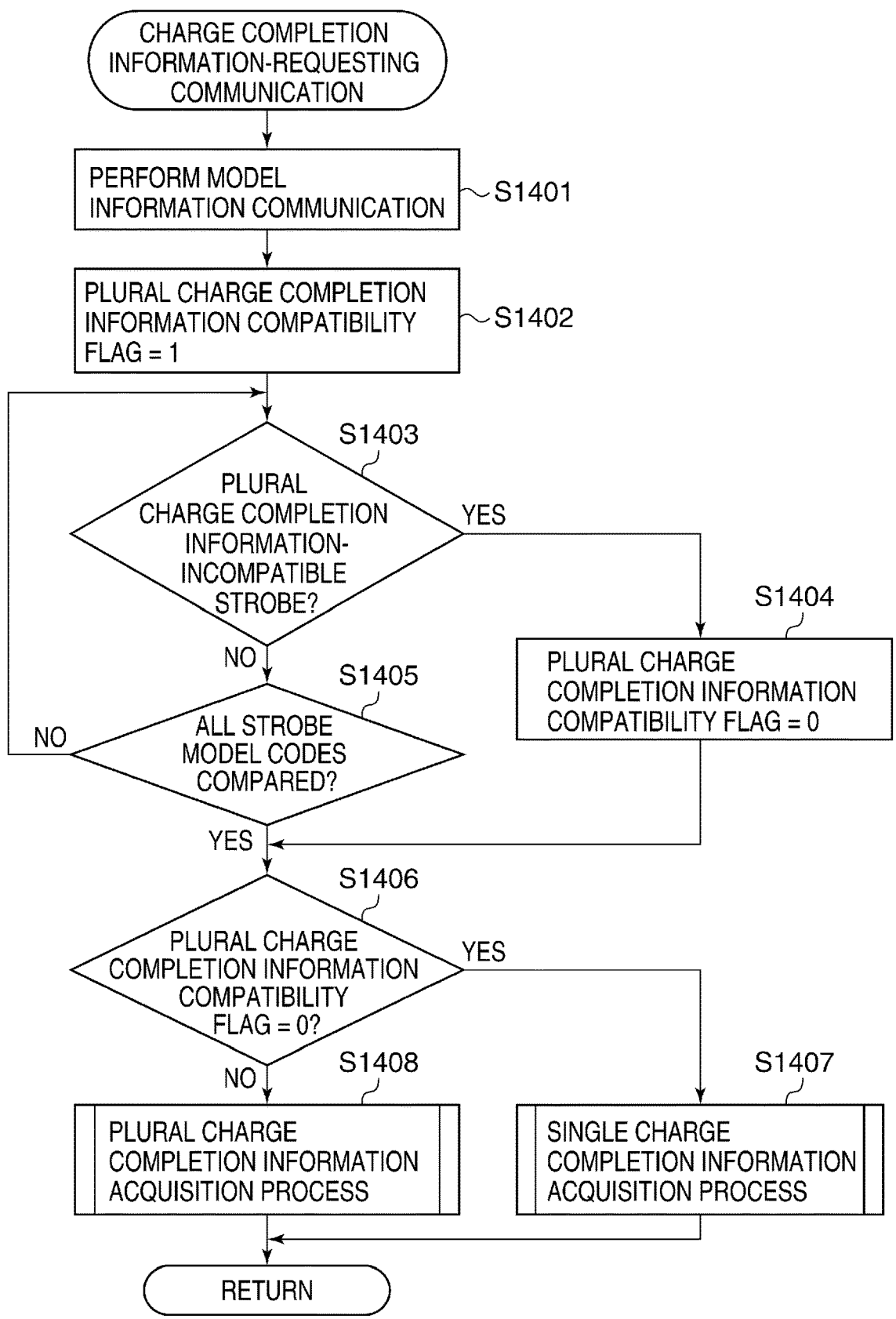
FIG. 14 is a flowchart of a charge completion information-requesting communication process performed by the camera, for an external strobe device as a lighting device according to a second embodiment of the present invention.

FIG. 14 is a flowchart of a charge completion information-requesting communication process performed by the camera. Processing operations in steps in FIG. 14 are performed by the CPU of the camera controller 101 executing an associated program stored in the ROM or the like of the camera controller 101 and loaded into the RAM of the same.

Referring to FIG. 14, in a step S1401, the camera controller 101 performs model information communication with the external strobe 200, and proceeds to a step S1402. At this time, the external strobe 200 transmits strobe model information according to the received model information.

FIG. 19A is a diagram showing the contents of the model information communication between the camera and the external strobe 200. The camera transmits a camera model code of the second byte to the external strobe 200, and the external strobe 200 transmits a strobe model code of the second byte to the camera.

In the step S1402, the camera controller 101 sets a plural charge completion information compatibility flag, stored in the RAM, to 1, and proceeds to a step S1403. In the step S1403, the camera controller 101 compares the strobe model code, received from the external strobe 200, with a plural charge completion information-incompatible strobe model table (see FIG. 18A) stored in the RAM.

Then, if the received strobe model code matches a strobe model code in the strobe model table, the camera controller 101 proceeds to a step S1404, whereas if not, the camera controller 101 proceeds to a step S1405. In the step S1405, the camera controller 101 checks whether or not all of the strobe model codes in the strobe model table have been compared, and if all of the strobe model codes in the strobe model table have been compared, the camera controller 101 proceeds to a step S1406, whereas if not, the camera controller 101 returns to the step S1403. Thus, the camera controller 101 determines whether or not the connected external strobe is a strobe compatible with the plural charge completion information.

In the step S1404, the camera controller 101 sets the plural charge completion information compatibility flag, stored in the RAM, to 0, and proceeds to the step S1406. If it is determined in the step S1406 that the plural charge completion information compatibility flag is equal to 0, the camera controller 101 proceeds to the single charge completion information acquisition process in a step S1407. Note that the single charge completion information acquisition process in the step S1407 is the same as the process in FIG. 7, described in the first embodiment, and hence description thereof is omitted. Further, if the plural charge completion information compatibility flag is equal to 1, the camera controller 101 proceeds to a plural charge completion information acquisition process in a step S1408. The plural charge completion information acquisition process in this step will be described in detail hereinafter with reference to FIG. 15.

Figure 15:
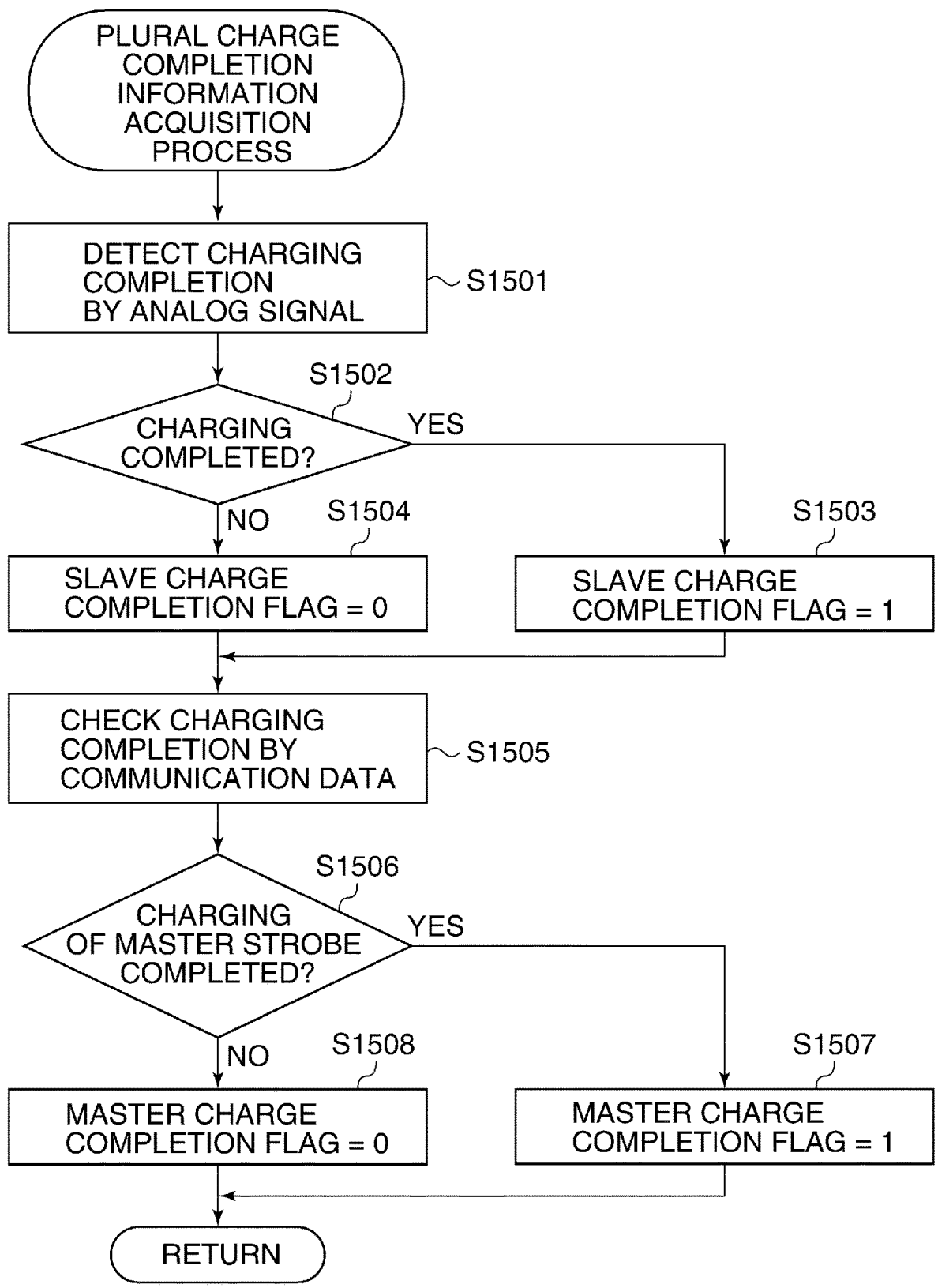
FIG. 15 is a flowchart of a plural charge completion information acquisition process performed in a step in FIG. 14.

FIG. 15 is a flowchart of the plural charge completion information acquisition process performed in the step S1408 in FIG. 14.

Referring to FIG. 15, in a step S1501, the camera controller 101 communicates with the strobe control section 118 to detect the analog signal indicative of (Hi/Low of) the voltage (or electric current) of the connection terminal for acquisition of the charge completion information of the external strobe 200, and proceeds to a step S1502. If it is determined in the step S1502 that the charging of the external strobe 200 is completed based on the result of detection indicated by the analog signal in the step S1501, the camera controller 101 proceeds to a step S1503, whereas if not, the camera controller 101 proceeds to a step S1504.

In the step S1503, the camera controller 101 sets the slave charge completion flag, stored in the RAM, to 1, and proceeds to a step S1505. In the step S1504, the camera controller 101 sets the slave charge completion flag, stored in the RAM, to 0, and proceeds to the step S1505.

In the step S1505, the camera controller 101 communicates with the external strobe 200 via the strobe control section 118 using the digital communication terminals, appearing in FIG. 2, to receive the master charge completion information, and proceeds to a step S1506.

Here, the master charge completion information communication will be described with reference to FIG. 19B. As shown in FIG. 19B, the master charge completion information communication is performed by 2-byte communication. When data "54" of the first byte is transmitted from the camera, the external strobe 200 transmits the master charge completion information as the DATA 1 of the second byte to the camera. If the charging of the master strobe is not completed, 0 is input as the DATA 1, whereas if the charging of the master strobe is completed, 1 is input as the DATA 1.

If it is determined in the step S1506 that the charging of the master strobe is completed, the camera controller 101 proceeds to a step S1507, whereas if not, the camera controller 101 proceeds to a step S1508. In the step S1507, the camera controller 101 sets the master charge completion flag to 1, and returns, and in the step S1508, the camera controller 101 sets the master charge completion flag to 0, and returns. In the present embodiment, when the master charge completion flag is equal to 1, the camera controller 101 determines that the charging of the external strobe 200 is completed, and performs the strobe control. In the present embodiment, the slave information includes only the all slave charge completion information, and hence the charge completion information is displayed on the information display section 107a within the viewfinder of the camera as shown in FIG. 10A, and cannot be displayed as shown in FIG. 10B.

Next, the operation of the external strobe 200 will be described with reference to FIGS. 16 to 19B. In the control process of the external strobe 200, the present embodiment differs from the first embodiment (see FIG. 11) only in the process for communication with the camera (step S1106) and the charge completion information (analog signal) output process (step S1107), and hence the description is given of these processes.

Figure 16:
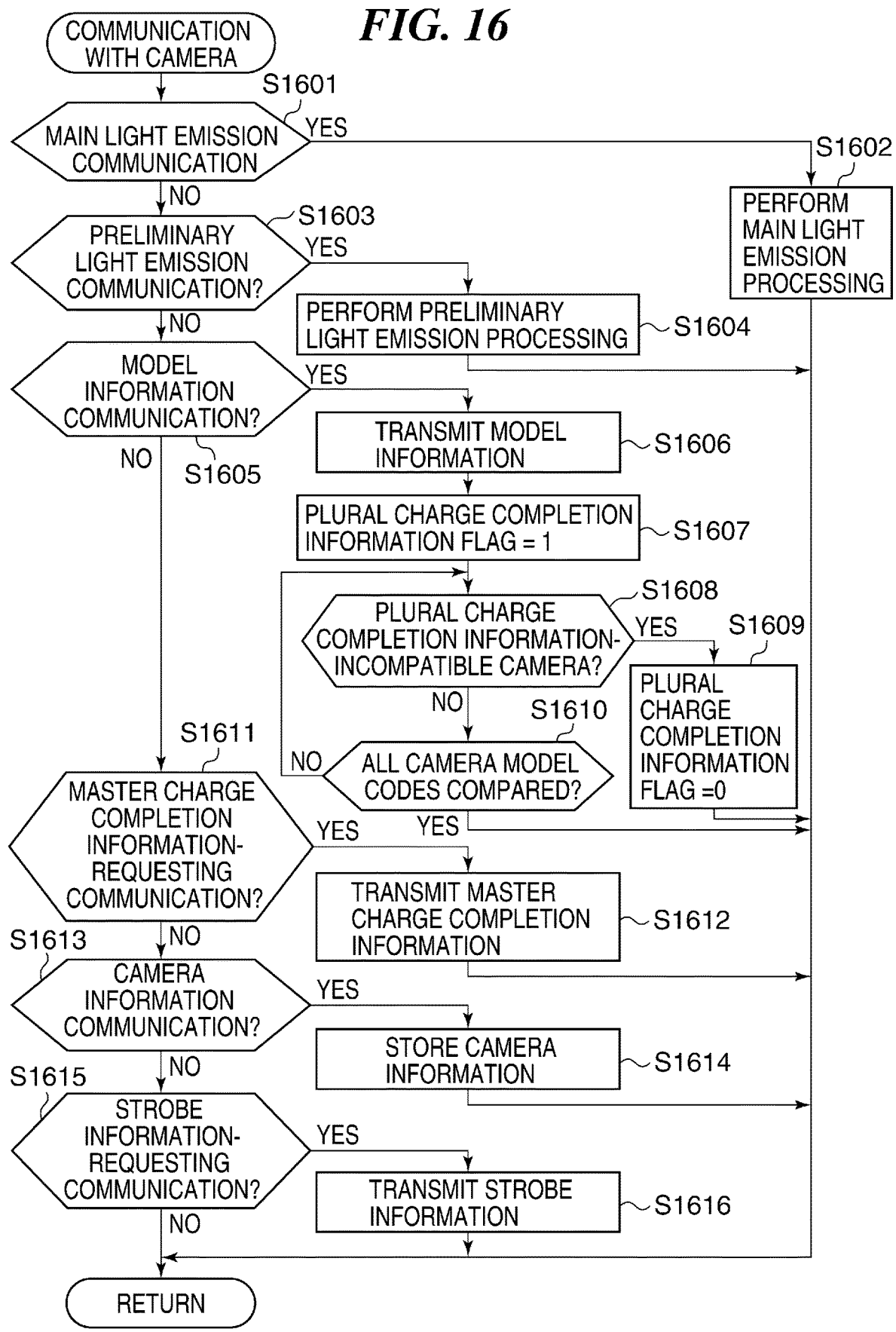
FIG. 16 is a flowchart of a process for communication with the camera.

FIG. 16 is a flowchart of the process for communication with the camera. Referring to FIG. 16, if it is determined in a step S1601 that the communication from the camera is main light emission communication, the strobe controller 203 proceeds to a step S1602, whereas if not, the strobe controller 203 proceeds to a step S1603. In the step S1602, the strobe controller 203 performs main light emission processing, and returns. If it is determined in the step S1603 that the communication from the camera communicates is preliminary light emission communication, the strobe controller 203 proceeds to a step S1604, whereas if not, the strobe controller 203 proceeds to a step S1605.

In the step S1604, the strobe controller 203 performs preliminary light emission processing including storing preliminary light emission information, such as an amount of preliminary light emission, in the RAM, and returns. If it is determined in the step S1605 that the communication from the camera is model information communication, the strobe controller 203 proceeds to a step S1606, whereas if not, the strobe controller 203 proceeds to a step S1611.

In the step S1606, the strobe controller 203 performs the model information communication the contents of which are shown in FIG. 19A to thereby receive a camera model code from the camera and transmit a strobe model code to the camera, and proceeds to a step S1607. In the step S1607, the strobe controller 203 sets the plural charge completion information flag to 1, and proceeds to a step S1608.

In the step S1608, the strobe controller 203 compares the camera model code received in the step S1606, with a camera model code in a plural charge completion information-incompatible camera model table (see FIG. 18B) stored in the RAM.

Then, if the received camera model code matches a camera model code in the camera model table, the strobe controller 203 proceeds to a step S1609, whereas if not, the strobe controller 203 proceeds to a step S1610. In the step S1610, the strobe controller 203 checks whether or not all of the camera model codes in the camera model table (see FIG. 18B) have been compared, and if all of the camera model codes in the camera model table have been compared, the strobe controller 203 returns, whereas if not, the strobe controller 203 returns to the step S1608.

In the step S1609, the strobe controller 203 sets the plural charge completion information flag to 0, and returns. Thus, the strobe controller 203 determines whether or not the connected camera is a camera compatible with the plural charge completion information.

If it is determined in the step S1611 that the communication from the camera is master charge completion information-requesting communication, the strobe controller 203 proceeds to a step S1612, whereas if not, the strobe controller 203 proceeds to a step S1613. In the step S1612, the strobe controller 203 transmits the master charge completion information by the master charge completion information communication the contents of which are shown in FIG. 19B, to the camera, and returns.

If it is determined in the step S1613 that the communication from the camera is the camera information communication, the strobe controller 203 proceeds to a step S1614, whereas if not, the strobe controller 203 proceeds to a step S1615. In the step S1614, the strobe controller 203 receives the camera information (a photographing mode, a shutter speed, an aperture, a zoom position, preliminary light emission information, etc.) from the camera, stores the received information in the RAM, and returns.

If it is determined in the step S1615 that the communication from the camera is the strobe information-requesting communication, the strobe controller 203 proceeds to a step S1616, whereas if not, the strobe controller 203 returns. In the step S1616, the strobe controller 203 transmits the strobe information (a strobe mode, battery information, guide number information, etc.) to the camera, and returns.

Figure 17:
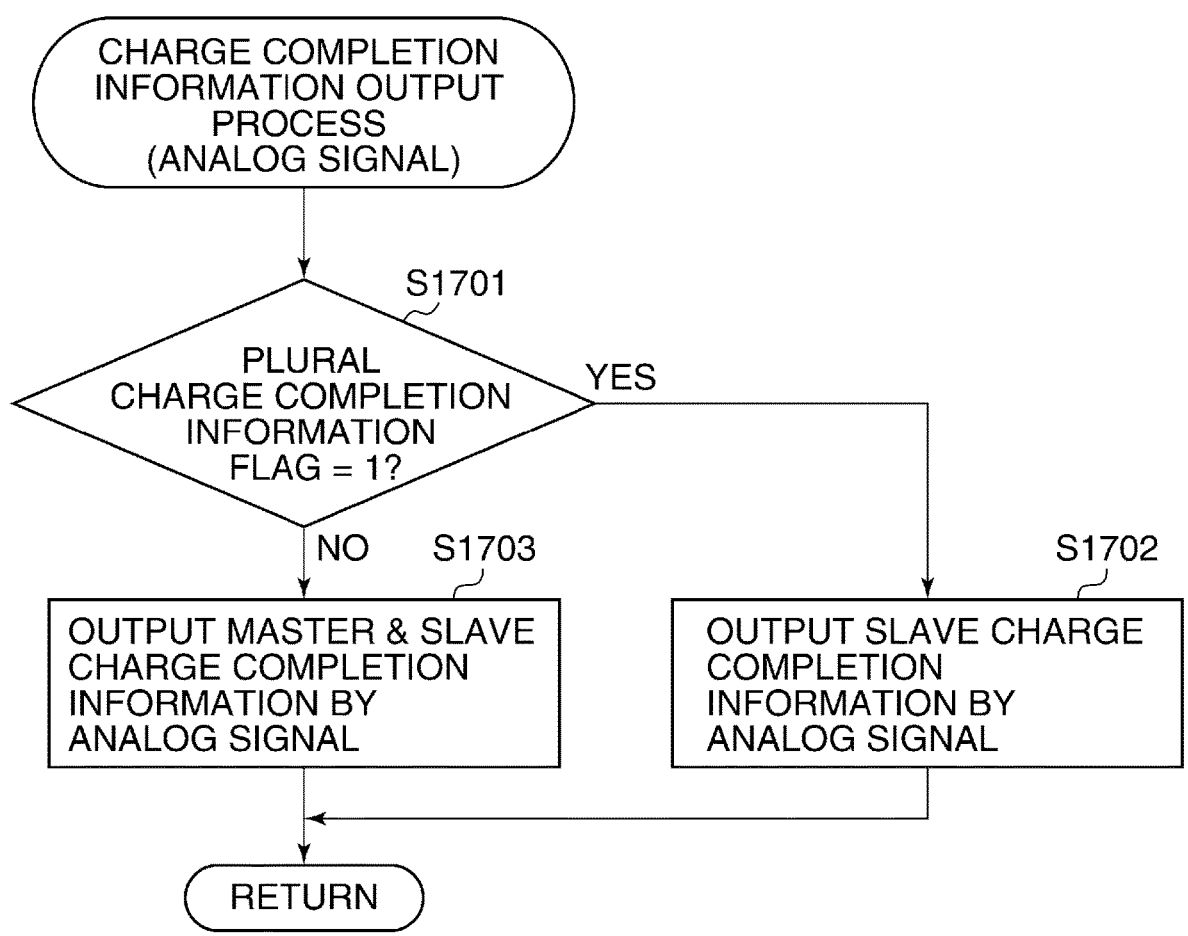
FIG. 17 is a flowchart of a charge completion information (analog signal) output process performed by the external strobe device.

FIG. 17 is a flowchart of the charge completion information (analog signal) output process. Referring to FIG. 17, if it is determined in a step S1701 that the plural charge completion information flag is equal to 1, the strobe controller 203 proceeds to a step S1702, whereas if not, the strobe controller 203 proceeds to a step S1703. In the step S1702, as a plural charge completion information-compatible output, the strobe controller 203 delivers an analog signal indicative the slave charge completion information to the camera, and returns. Here, if the charging of the all the slave strobes is completed, the analog signal is set to Low, whereas if not, the analog signal is set to Hi.

In the step S1703, as the plural charge completion information-incompatible output, the strobe controller 203 delivers an analog signal indicative of the master charge completion information and the slave charge completion information to the camera, and returns. Here, if the charging of both of the master strobe and the slave strobes is completed, the analog signal is set to Low, whereas if not, the analog signal is set to Hi.

As described above, in the present embodiment, the external strobe 200 determines whether or not the connected camera is compatible with the plural charge completion information, based on the model information received from the camera. Then, if it is determined that the connected camera is compatible with the plural charge completion information, the external strobe 200 is enabled to notify the camera of the slave charge completion information by the output of the analog signal, and of the master charge completion information by digital communication. Further, if the connected camera is incompatible with the plural charge completion information, the external strobe 200 outputs both of the master charge completion information and the slave charge completion information as the analog signal. With this, even when there are a plurality of strobe charge completion information items to be notified in the multi-light control, it is possible to notify the camera of the plurality of strobe charge completion information items.

Note that although in the present embodiment, in a case where the camera is incompatible with the plural charge completion information, the external strobe 200 outputs the master charge completion information and the slave charge completion information as the analog signal, the external strobe 200 may output only the master charge completion information as the analog signal. Other configuration and advantageous effects are the same as those of the first embodiment.

Next, a description will be given of an external strobe as a lighting device according to a third embodiment of the present invention with reference to FIGS. 20 to 23, etc. The following description is given mainly of different points of the present embodiment from the first embodiment, while denoting components identical or corresponding to those of the first embodiment by the same reference numerals and referring to the same figures.

Figure 20:
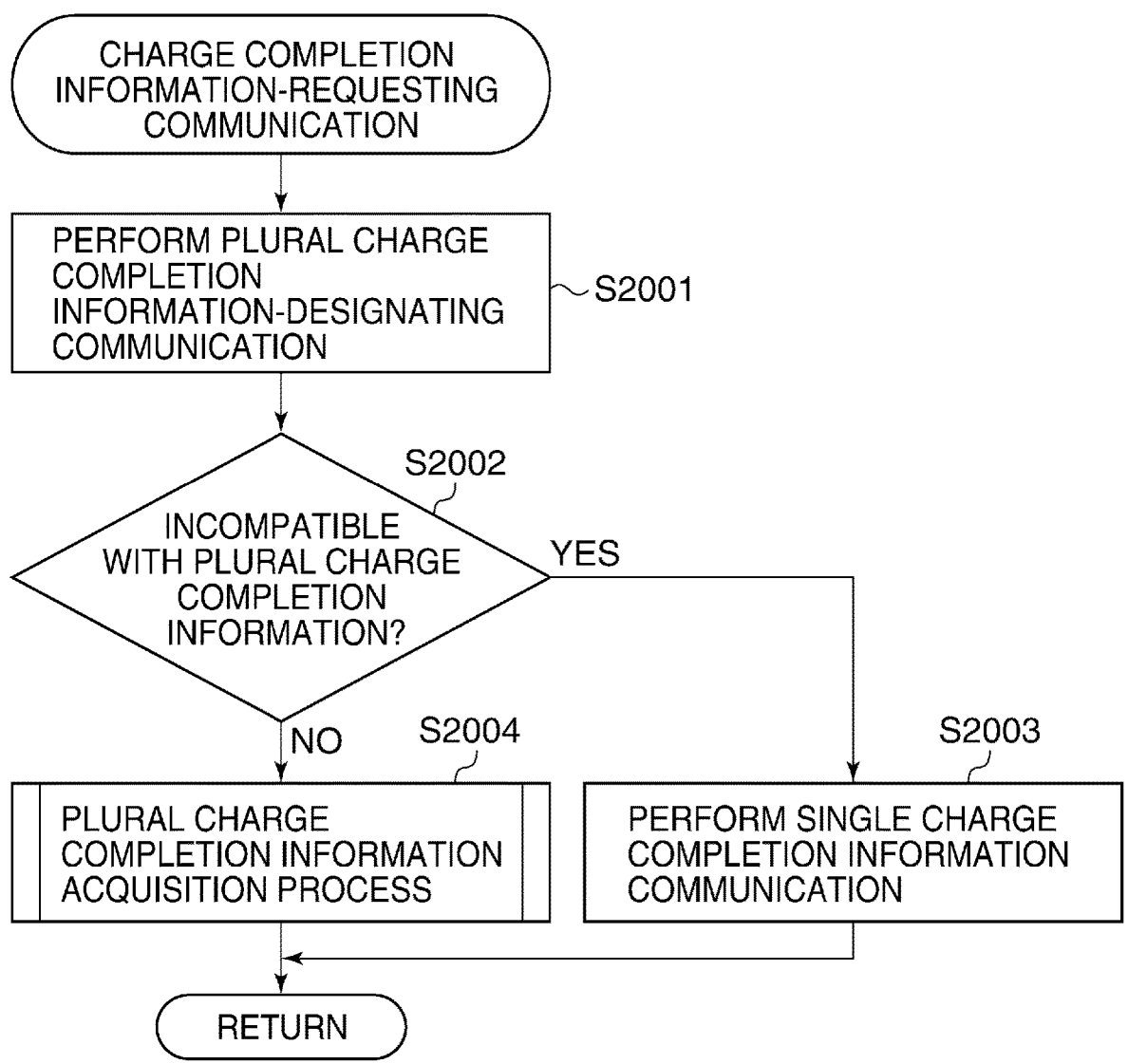
FIG. 20 is a flowchart of a charge completion information-requesting communication process performed by the camera, for an external strobe device as a lighting device according to a third embodiment of the present invention.

FIG. 20 is a flowchart of a charge completion information-requesting communication process performed by the camera. Processing operations in steps in FIG. 20 are performed by the CPU of the camera controller 101 executing an associated program stored in the ROM or the like of the camera controller 101 and loaded into the RAM of the same.

Referring to FIG. 20, in a step S2001, the camera controller 101 performs plural charge completion information-designating communication with the external strobe 200, and proceeds to a step S2002. At this time, the external strobe 200 receives designating information by the plural charge completion information-designating communication, and transmits information indicative of whether or not the external strobe 200 is compatible with the plural charge completion information, to the camera.

More specifically, as described with reference to FIG. 9A, when the data "40" is transmitted from the camera, if the external strobe 200 is incompatible with the plural charge completion information, the external strobe 200 inputs 0 as the DATA 1, whereas if the external strobe 200 is compatible with the plural charge completion information, the external strobe 200 inputs 1 as the DATA 1, and then transmits the DATA 1 to the camera.

If it is determined in the step S2002, based on the communication in the step S2001, that the external strobe 200 is incompatible with the plural charge completion information, the camera controller 101 proceeds to a step S2003, whereas if the external strobe 200 is compatible with the plural charge completion information, the camera controller 101 proceeds to a step S2004. In the step S2003, the camera controller 101 performs the master charge completion information communication the contents of which are shown in FIG. 19B, as the single charge completion information communication to acquire the master charge completion information, and returns. In the step S2004, the camera controller 101 performs the same process as the plural charge completion information acquisition process, described hereinbefore with reference to FIG. 8, and returns.

Next, the operation of the external strobe 200 will be described with reference to FIGS. 21 and 22. In the control process of the external strobe 200, the present embodiment differs from the first embodiment (see FIG. 11) only in the process for communication with the camera (step S1106) and the charge completion information (analog signal) output process (step S1107), and hence the description is given of these processes.

Figure 21:
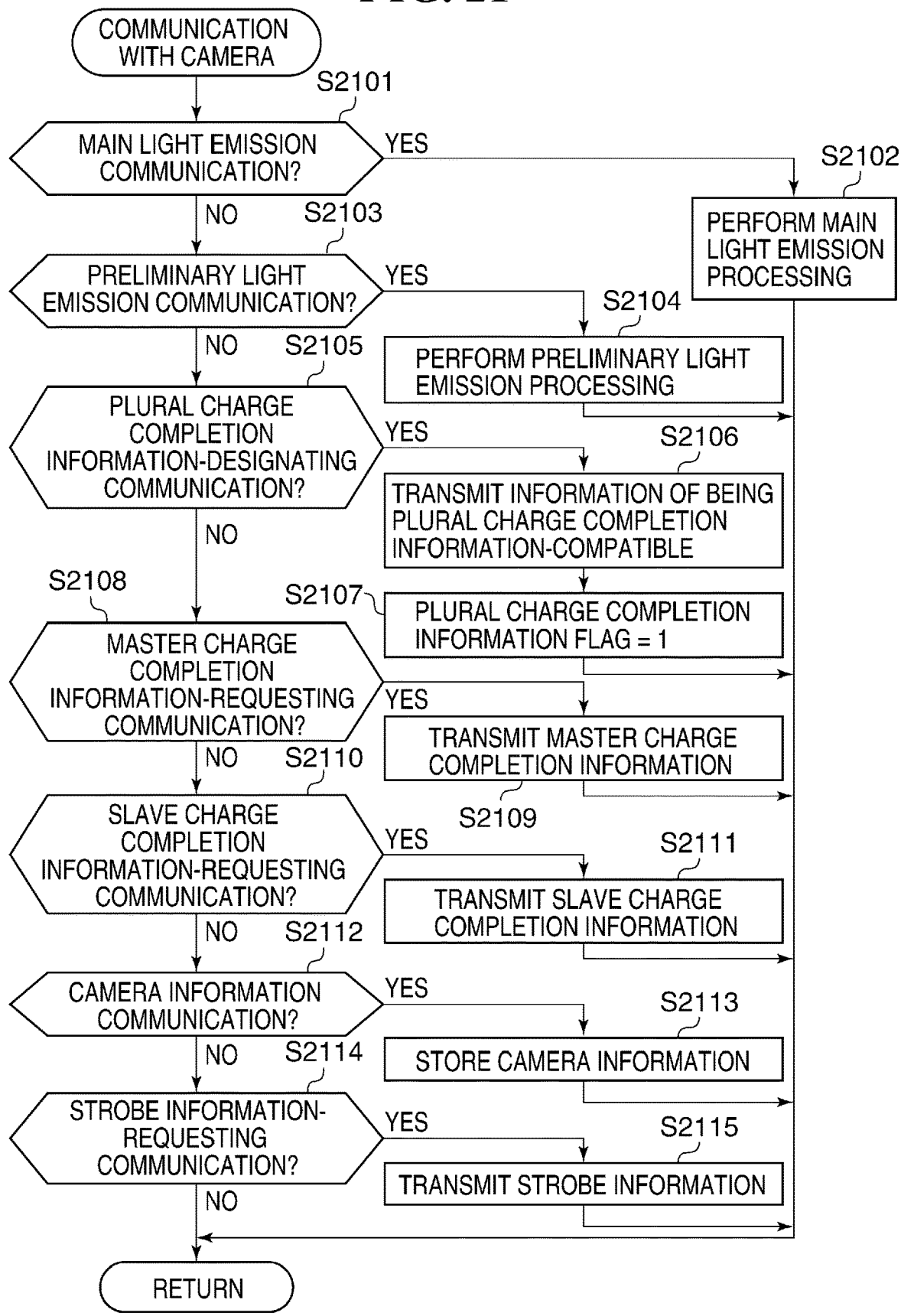
FIG. 21 is a flowchart of a process for communication with the camera.

FIG. 21 is a flowchart of the process for communication with the camera. Referring to FIG. 21, if it is determined in a step S2101 that the communication from the camera is the main light emission communication, the strobe controller 203 proceeds to a step S2102, whereas if not, the strobe controller 203 proceeds to a step S2103. In the step S2102, the strobe controller 203 performs the main light emission processing, and returns.

If it is determined in the step S2103 that the communication from the camera is the preliminary light emission communication, the strobe controller 203 proceeds to a step S2104, whereas if not, the strobe controller 203 proceeds to a step S2105. In the step S2104, the strobe controller 203 performs the preliminary light emission processing including storing preliminary light emission information, such as an amount of preliminary light emission, in the RAM, and returns.

If it is determined in the step S2105 that the communication from the camera is the plural charge completion information-designating communication, the strobe controller 203 proceeds to a step S2106, whereas if not, the strobe controller 203 proceeds to a step S2108. In the step S2106, the strobe controller 203 performs the plural charge completion information-designating communication the contents of which are shown in FIG. 9A to thereby transmit information indicating that the external strobe 200 is compatible with the plural charge completion information to the camera (since the external strobe 200 is assumed to be compatible with the plural charge completion information, as mentioned above), and proceeds to a step S2107. In the step S2107, the strobe controller 203 sets the plural charge completion information flag stored in the RAM to 1, to thereby indicate that the plurality of strobe charge completion information items are to be transmitted to the camera, and returns.

If it is determined in the step S2108 that the communication from the camera is the master charge completion information-requesting communication, the strobe controller 203 proceeds to a step S2109, whereas if not, the strobe controller 203 proceeds to a step S2110. In the step S2109, the strobe controller 203 transmits the master charge completion information by the master charge completion information the contents of which are shown in FIG. 19B, to the camera, and returns. If it is determined in the step S2110 that the communication from the camera is the slave charge completion information-requesting communication, the strobe controller 203 proceeds to a step S2111, whereas if not, the strobe controller 203 proceeds to a step S2112. In the step S2111, the strobe controller 203 transmits the slave charge completion information by the plural slave charge completion information communication as an example of the slave charge completion information communication, the contents of which are shown in FIG. 9B, to the camera, and returns.

If it is determined in the step S2112 that the communication from the camera is the camera information communication, the strobe controller 203 proceeds to a step S2113, whereas if not, the strobe controller 203 proceeds to a step S2114. In the step S2113, the strobe controller 203 stores the camera information (a photographing mode, a shutter speed, an aperture, a zoom position, preliminary light emission information, etc.) in the RAM, and returns. If it is determined in the step S2114 that the communication from the camera is the strobe information-requesting communication, the strobe controller 203 proceeds to a step S2115, whereas if not, the strobe controller 203 returns. In the step S2115, the strobe controller 203 transmits the strobe information (a strobe mode, battery information, guide number information, etc.) to the camera, and returns.

Figure 22:
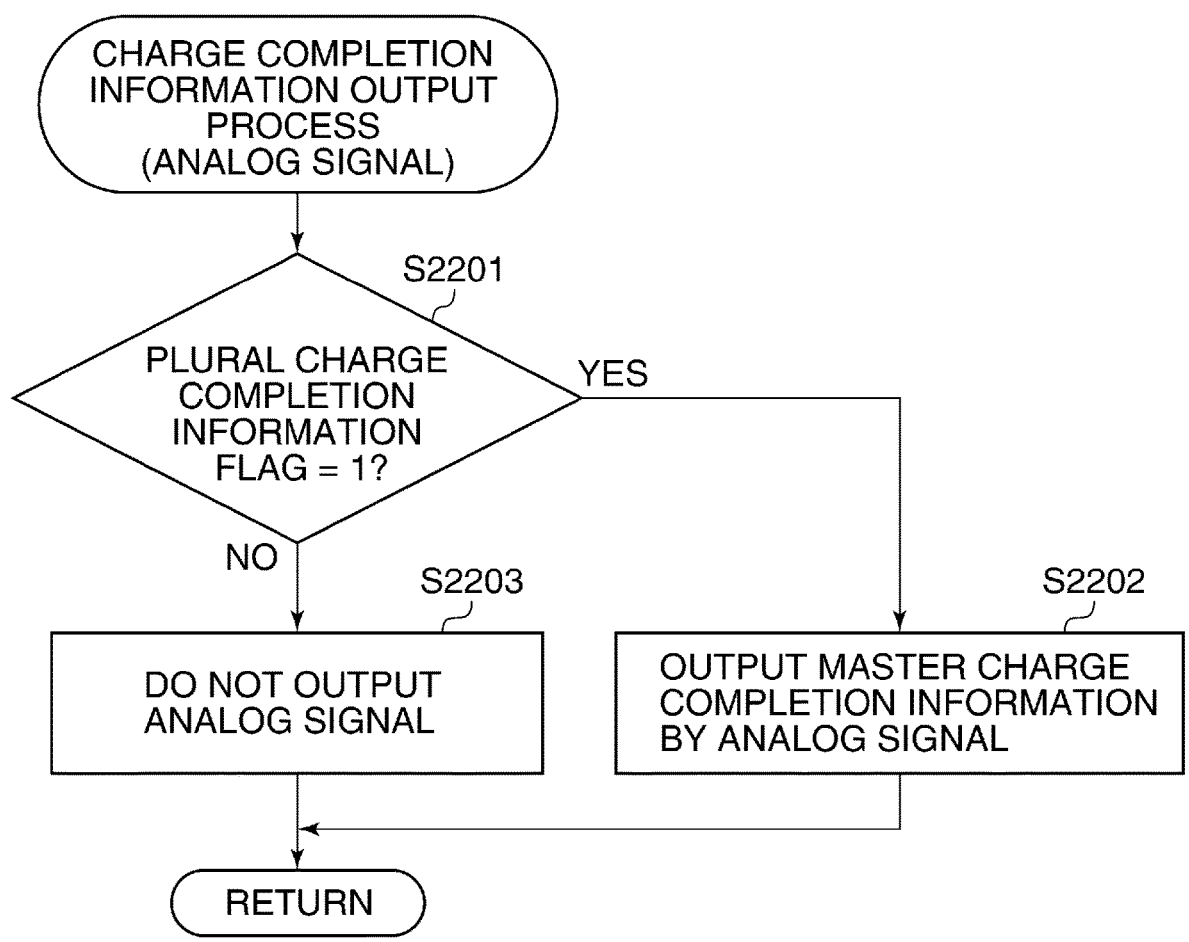
FIG. 22 is a flowchart of a charge completion information (analog signal) output process performed by the external strobe device.

FIG. 22 is a flowchart of the charge completion information (analog signal) output process. Referring to FIG. 22, if it is determined in a step S2201 that the plural charge completion information flag is equal to 1, the strobe controller 203 proceeds to a step S2202, whereas if not, the strobe controller 203 proceeds to a step S2203. In the step S2202, as a plural charge completion information-compatible output, the strobe controller 203 delivers an analog signal indicative the master charge completion information to the camera, and returns. Here, if the charging of the master strobe is completed, the analog signal is set to Low, whereas if not, the analog signal is set to Hi.

As described above, in the present embodiment, when the plural charge completion information-designating communication is performed from the camera to the external strobe 200, the external strobe 200 is enabled to notify the camera of the master charge completion information by the output of the analog signal, and of the slave charge completion information by digital communication. Further, in a case where the plural charge completion information-designating communication from the camera does not occur, the external strobe 200 transmits the master charge completion information to the camera by digital communication.

Although in the present embodiment, the strobe charge completion information is switched to the plural strobe charge completion information according to the designating information by the plural charge completion information-designating communication from the camera to the external strobe 200, this is not limitative. For example, instead of this, the strobe charge completion information may be switched to the plural strobe charge completion information by the camera notifying the external strobe 200 of information indicating that the camera is compatible with the plural charge completion information as the camera information, and the external strobe 200, upon receipt of the camera information, notifying the camera that the external strobe 200 is compatible with the plural charge completion information.

Further, although in the present embodiment, the external strobe 200 outputs only the master charge completion information as the analog signal in a case where the plural charge completion information-designating communication from the camera does not occur, information, shown in FIG. 23, indicating that the charging of the master strobe and all the slave strobes is completed may be used. Other configuration and advantageous effects are the same as those of the first embodiment.

Next, a description will be given of an external strobe as a lighting device according to a fourth embodiment of the present invention with reference to FIG. 24, etc. The following description is given of mainly of different points of the present embodiment from the first embodiment, while denoting components identical or corresponding to those of the first embodiment by the same reference numerals and referring to the same figures. Further, the process for communication with the camera is the same as that in the third embodiment (see FIG. 21), and hence description thereof is omitted.

Figure 24:
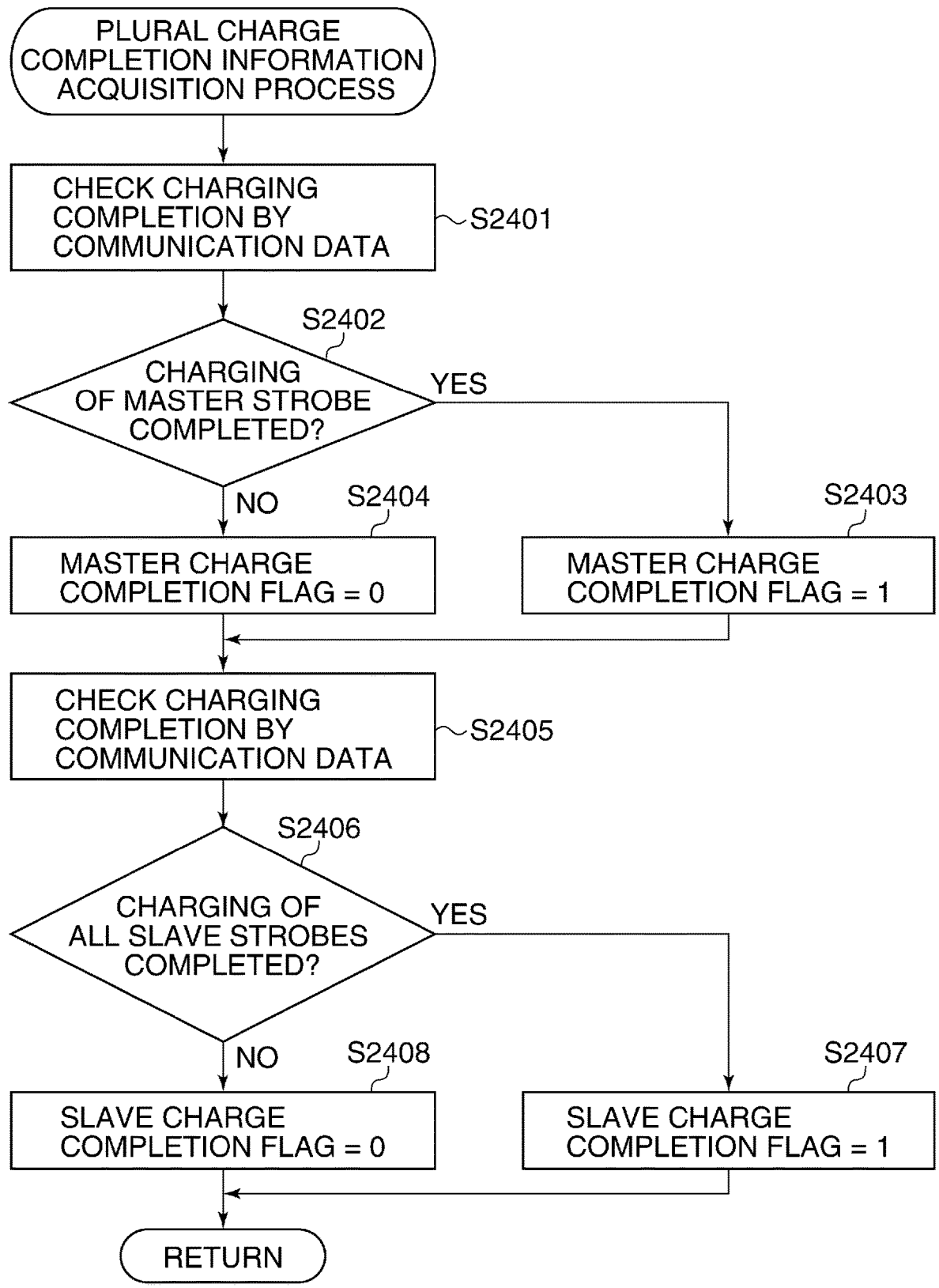
FIG. 24 is a flowchart of a plural charge completion information acquisition process performed by the camera, for an external strobe device as a lighting device according to a fourth embodiment of the present invention.

FIG. 24 is a flowchart of a plural charge completion information acquisition process performed by the camera. Processing operations in steps in FIG. 24 are performed by the CPU of the camera controller 101 executing an associated program stored e.g. in the ROM of the camera controller 101 and loaded into the RAM of the same.

Referring to FIG. 24, in a step S2401, the camera controller 101 communicates with the external strobe 200 via the strobe control section 118 using the digital communication terminals, appearing in FIG. 2, to receive the master charge completion information, described with reference to FIG. 19B, and proceeds to a step S2402. Note that in this communication, the master charge completion information and the slave charge completion information, shown in FIG. 25, may be simultaneously received.

If it is determined in the step S2402 that the charging of the master strobe is completed, the camera controller 101 proceeds to a step S2403, whereas if not, the camera controller 101 proceeds to a step S2404. In the step S2403, the camera controller 101 sets the master charge completion flag, stored in the RAM, to 1, and proceeds to a step S2405. In the step S2404, the camera controller 101 sets the master charge completion flag, stored in the RAM, to 0, and proceeds to the step S2405.

In the step S2405, the camera controller 101 communicates with the external strobe 200 via the strobe control section 118 using the digital communication terminals, appearing in FIG. 2, to receive the slave charge completion information, described with reference to FIG. 9B, and proceeds to a step S2406. Note that if the slave charge completion information, shown in FIG. 25, has been received in the step S2401, the step S2405 is not required to be executed to receive the slave charge completion information.

If it is determined in the step S2406 that the charging of all the slave strobes is completed, the camera controller 101 proceeds to a step S2407, whereas if not, the camera controller 101 proceeds to a step S2408. In the step S2407, the camera controller 101 sets the slave charge completion flag to 1, and returns. In the step S2408, the camera controller 101 sets the slave charge completion flag to 0, and returns.

As described above, in the present embodiment, in a case where the designating information by the plural charge completion information-designating communication is notified from the camera to the external strobe 200, the external strobe 200 is enabled to notify the camera of the master charge completion information and the slave charge completion information, separately by digital communication. Further, in a case where the plural charge completion information-designating communication from the camera does not occur, the external strobe 200 outputs the master charge completion information and the slave charge completion information as the analog signal.

Although in the present embodiment, the strobe charge completion information is switched to the plural strobe charge completion information according to the designating information by the plural charge completion information-designating communication from the camera to the external strobe 200, this is not limitative. For example, instead of this, the strobe charge completion information may be switched to the plural strobe charge completion information by the camera notifying the external strobe 200 of information indicating that the camera is compatible with the plural charge completion information as the camera information, and the external strobe 200, upon receipt of the camera information, notifying the camera that the external strobe 200 is compatible with the plural charge completion information.

Further, although in the present embodiment, the external strobe 200 outputs the master charge completion information and the slave charge completion information as the analog signal in a case where the plural charge completion information-designating communication from the camera does not occur, the external strobe 200 may output only the master charge completion information as the analog signal. Other configuration and advantageous effects are the same as those of the first embodiment.

Next, a description will be given of an external strobe as a lighting device according to a fifth embodiment of the present invention with reference to FIGS. 26 and 27, etc. The following description is given of mainly of different points of the present embodiment from the first embodiment, while denoting components identical or corresponding to those of the first embodiment by the same reference numerals and referring to the same figures. Further, the process for communication with the camera is the same as that in the third embodiment (see FIG. 21), and hence description thereof is omitted.

Figure 26:
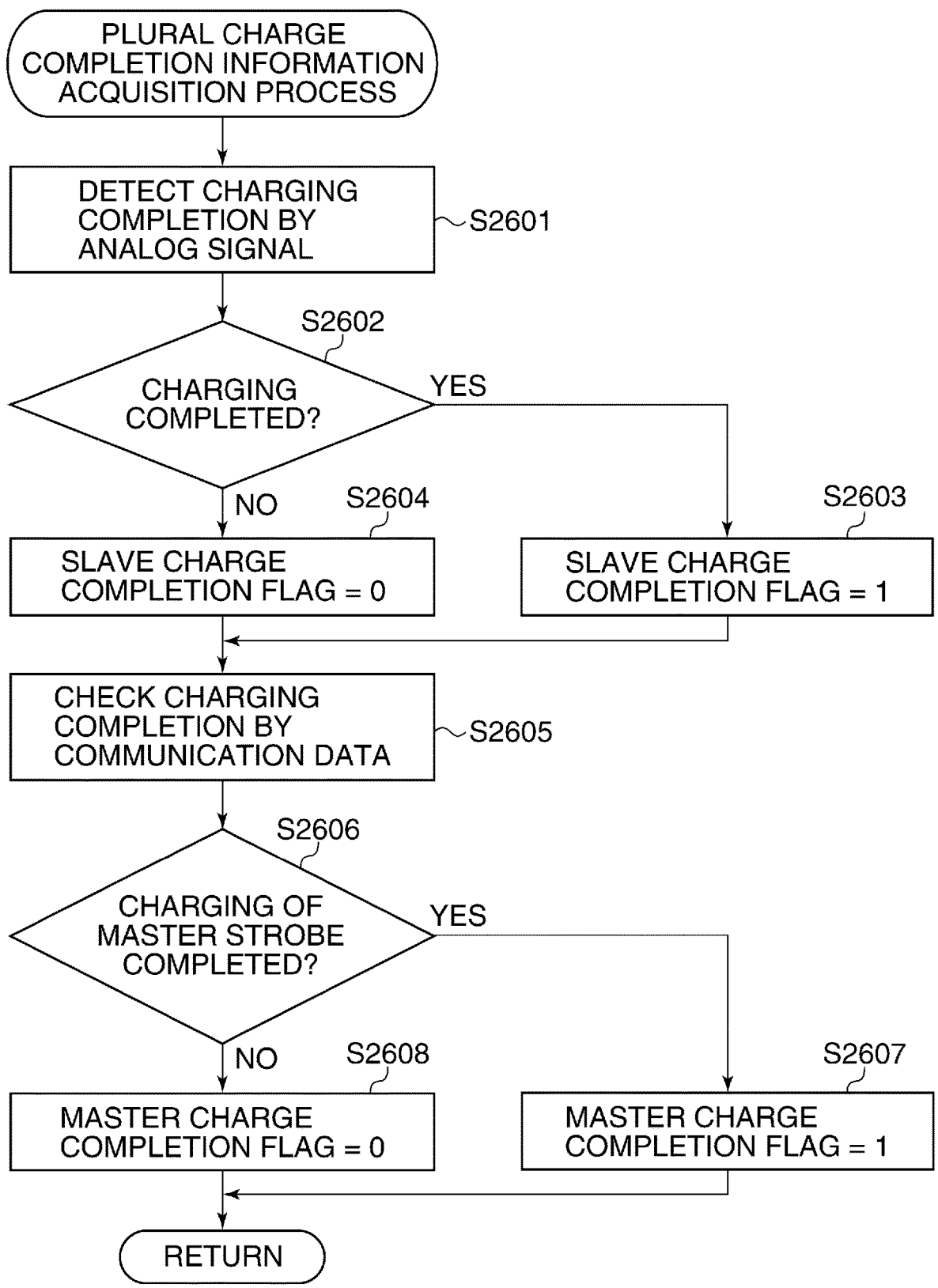
FIG. 26 is a flowchart of a plural charge completion information acquisition process performed by the camera, for an external strobe device as a lighting device according to a fifth embodiment of the present invention.

FIG. 26 is a flowchart of a plural charge completion information acquisition process performed by the camera. Processing operations in steps in FIG. 26 are performed by the CPU of the camera controller 101 executing an associated program stored e.g. in the ROM of the camera controller 101 and loaded into the RAM of the same.

Referring to FIG. 26, in a step S2601, the camera controller 101 communicates with the strobe control section 118 to detect the analog signal indicative of (Hi/Low of) the voltage (or electric current) of the connection terminal for acquisition of the charge completion information of the external strobe 200, and proceeds to a step S2602. If it is determined in the step S2602 that the charging of the slave strobes is completed, based on the result of detection of the analog signal, the camera controller 101 proceeds to a step S2603, whereas if not, the camera controller 101 proceeds to a step S2604.

In the step S2603, the camera controller 101 sets the slave charge completion flag, stored in the RAM, to 1, and proceeds to a step S2605. In the step S2604, the camera controller 101 sets the slave charge completion flag, stored in the RAM, to 0, and proceeds to the step S2605. In the step S2605, the camera controller 101 communicates with the external strobe 200 via the strobe control section 118 using the digital communication terminals, appearing in FIG. 2, to receive the master charge completion information and the slave charge completion information, and proceeds to a step S2606. Here, the master charge completion information can be received as the information shown in FIG. 19B, and the slave charge completion information can be received as the information shown in FIG. 9B.

In the step S2606, if the charging of the master strobe is completed, the camera controller 101 proceeds to a step S2607, whereas if not, the camera controller 101 proceeds to a step S2608. In the step S2607, the camera controller 101 sets the master charge completion flag to 1, and returns, whereas in the step S2608, the camera controller 101 sets the master charge completion flag to 0, and returns. In the present embodiment, when the master charge completion flag is equal to 1, the camera controller 101 determines that the charging of the external strobe 200 is completed, and performs the strobe control.

Figure 27:
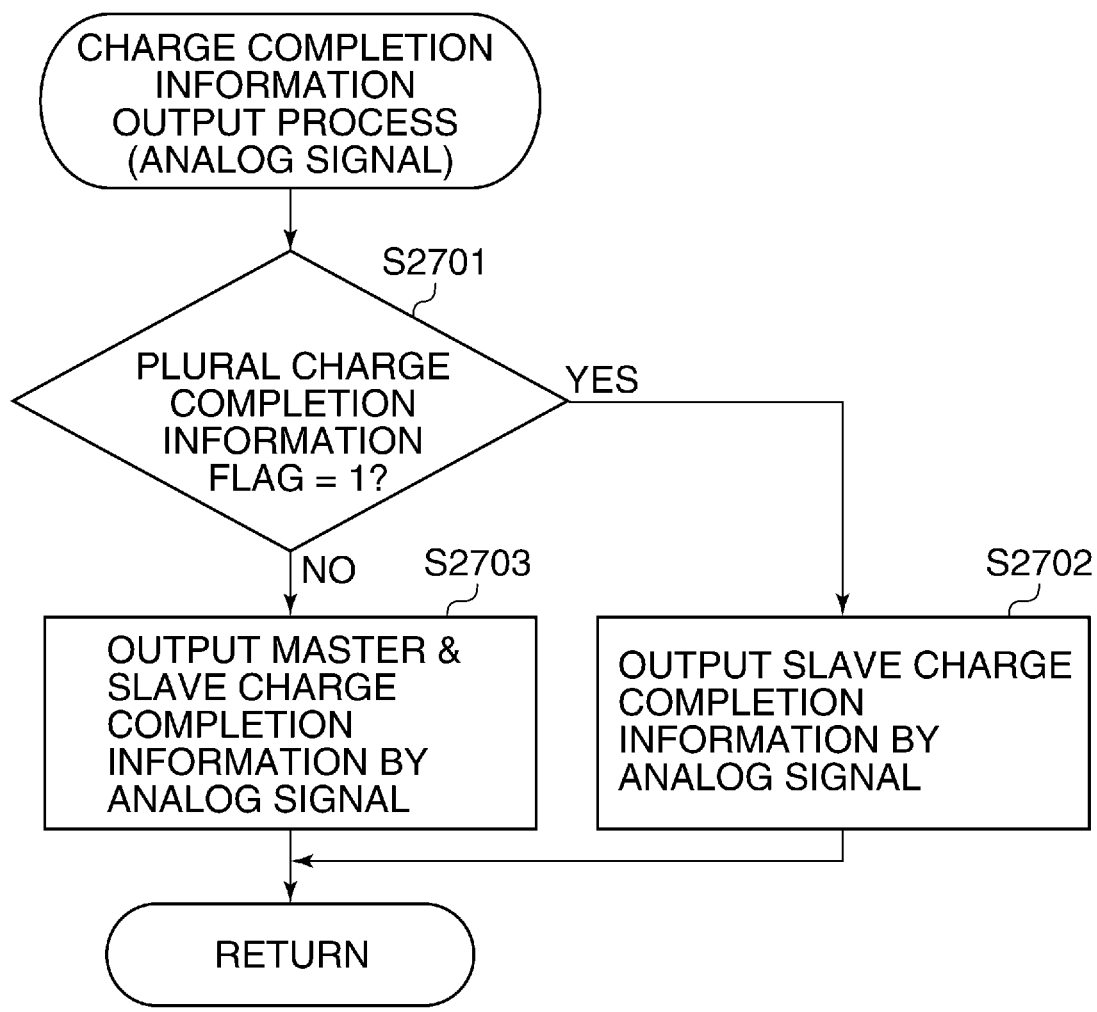
FIG. 27 is a flowchart of a charge completion information (analog signal) output process performed by the external strobe device.

FIG. 27 is a flowchart of the charge completion information (analog signal) output process performed by the external strobe 200. Referring to FIG. 27, if it is determined in a step S2701 that the plural charge completion information flag is equal to 1, the strobe controller 203 proceeds to a step S2702, whereas if not, the strobe controller 203 proceeds to a step S2703.

In the step S2702, as the plural charge completion information-compatible output, the strobe controller 203 delivers the analog signal indicative the slave charge completion information to the camera, and returns. Here, if the charging of the all the slave strobes is completed, the analog signal is set to Low, whereas if not, the analog signal is set to Hi. In the step S2703, as the plural charge completion information-incompatible output, the strobe controller 203 delivers the analog signal indicative of the master charge completion information and the slave charge completion information to the camera, and returns. Here, if the charging of both of the master strobe and the slave strobes is completed, the analog signal is set to Low, whereas if not, the analog signal is set to Hi.

As described above, in the present embodiment, in a case where the designating information by the plural charge completion information-designating communication is notified from the camera to the external strobe 200, the external strobe 200 notifies the camera of the slave charge completion information by the output of the analog signal, and of the master charge completion information and the slave charge completion information by digital communication. Further, in a case where the plural charge completion information-designating communication from the camera does not occur, the external strobe 200 transmits the master charge completion information and the slave charge completion information to the camera by the output of the analog signal.

Although in the present embodiment, the strobe charge completion information is switched to the plural strobe charge completion information according to the designating information by the plural charge completion information-designating communication from the camera to the external strobe 200, this is not limitative. For example, instead of this, the strobe charge completion information may be switched to the plural strobe charge completion information by the camera notifying the external strobe 200 of information indicating that the camera is compatible with the plural charge completion information as the camera information, and the external strobe 200, upon receipt of the camera information, notifying the camera that the external strobe 200 is compatible with the plural charge completion information.

Further, although in the present embodiment, the external strobe 200 outputs the master charge completion information and the slave charge completion information as the analog signal in a case where the plural charge completion information-designating communication from the camera does not occur, the external strobe 200 may output only the master charge completion information by the output of the analog signal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-062926 filed Mar. 28, 2017, which is hereby incorporated by reference herein in its entirety.

What is claimed is:

1. A lighting device that is connected to a plurality of other lighting devices in a manner capable of performing wireless communication therewith, and is communicably attached to an image pickup apparatus, so as to be driven in synchronism with the plurality of other lighting devices, comprising at least one processor executing programs stored in a memory to function as:
- an acquisition unit configured to acquire charge completion information of the lighting device itself as first charge completion information, and acquire charge completion information of the plurality of other lighting devices, from the plurality of other lighting devices, as second charge completion information;
- a transmission unit configured to transmit the first charge completion information and the second charge completion information in a combined state or transmit the first charge completion information and the second charge completion information in a separate state; and
- a determination unit configured to determine whether or not an instruction for transmitting the first charge completion information and the second charge completion information in the separate state has been received from the image pickup apparatus by communication with the image pickup apparatus,
- wherein in a case where it is determined by the determination unit that the instruction for transmitting the first charge completion information and the second charge completion information in the separate state has been received from the image pickup apparatus, the transmission unit transmits the first charge completion information and the second charge completion information to the image pickup apparatus in the separate state, and
- wherein in a case where it is not determined by the determination unit that the instruction for transmitting the first charge completion information and the second charge completion information in the separate state has been received from the image pickup apparatus, the transmission unit transmits the first charge completion information and the second charge completion information to the image pickup apparatus in the combined state.

2. The lighting device according to claim 1, wherein the transmission unit transmits a combined information item of the first charge completion information and the second charge completion information to the image pickup apparatus by analog communication, and
- wherein out of the first charge completion information and the second charge completion information as separate information items, the transmission unit transmits the first charge completion information to the image pickup apparatus by digital communication, and transmits the second charge completion information to the image pickup apparatus by analog communication.

3. The lighting device according to claim 1, wherein the transmission unit transmits a combined information item of the first charge completion information and the second charge completion information to the image pickup apparatus by digital communication, and
- wherein out of the first charge completion information and the second charge completion information as separate information items, the transmission unit transmits the first charge completion information to the image pickup apparatus by digital communication, and transmits the second charge completion information to the image pickup apparatus by analog communication.

4. The lighting device according to claim 1, wherein the transmission unit transmits a combined information item of the first charge completion information and the second charge completion information to the image pickup apparatus by analog communication,
- transmits the first charge completion information and the second charge completion information as separate information items to the image pickup apparatus by separating the contents of communication from each other, and
- further transmits the second charge completion information to the image pickup apparatus by analog communication, in a case where charging of all of the plurality of other lighting devices is completed.

5. The lighting device according to claim 1, wherein the transmission unit transmits a combined information item of the first charge completion information and the second charge completion information to the image pickup apparatus by analog communication, and
- out of the first charge completion information and the second charge completion information as separate information items, transmits the first charge completion information to the image pickup apparatus by analog communication, and transmits the second charge completion information to the image pickup apparatus by digital communication.

6. The lighting device according to claim 1, wherein the transmission unit transmits a combined information item of the first charge completion information and the second charge completion information to the image pickup apparatus by digital communication, and
- out of the first charge completion information and the second charge completion information as separate information items, transmits the first charge completion information to the image pickup apparatus by analog communication, and transmits the second charge completion information to the image pickup apparatus by digital communication.

7. The lighting device according to claim 1, wherein the transmission unit transmits a combined information item of the first charge completion information and the second charge completion information to the image pickup apparatus by analog communication, and
- transmits the first charge completion information and the second charge completion information as separate information items to the image pickup apparatus by digital communication by separating the contents of communication from each other.

8. The lighting device according to claim 1, wherein the transmission unit transmits a combined information item of the first charge completion information and the second charge completion information to the image pickup apparatus by digital communication, and
- transmits the first charge completion information and the second charge completion information as separate information items to the image pickup apparatus by digital communication by separating the contents of communication from each other.

9. The lighting device according to claim 5, wherein when transmitting the first charge completion information and the second charge completion information as separate information items to the image pickup apparatus by digital communication, the transmission unit transmits the second charge completion information separately as charge completion information of each of the plurality of other lighting devices and all charge completion information indicating that charging of all of the plurality of other lighting devices is completed.

10. A lighting device that is connected to a plurality of other lighting devices in a manner capable of performing wireless communication therewith, and is communicably attached to an image pickup apparatus, so as to be driven in synchronism with the plurality of other lighting devices, comprising at least one processor executing programs stored in a memory to function as:
- an acquisition unit configured to acquire charge completion information of the lighting device itself as first charge completion information, and acquire charge completion information of the plurality of other lighting devices, from the plurality of other lighting devices, as second charge completion information;
- a transmission unit configured to transmit the first charge completion information and the second charge completion information in a combined state or transmit the first charge completion information and the second charge completion information in a separate state; and
- a determination unit configured to determine whether or not the image pickup apparatus can receive the first charge completion information and the second charge completion information in the separate state, based on model information of the image pickup apparatus, acquired by communication with the image pickup apparatus,
- wherein in a case where it is determined by the determination unit that the image pickup apparatus can receive the first charge completion information and the second charge completion information in the separate state, the transmission unit transmits the first charge completion information and the second charge completion information to the image pickup apparatus in the separate state, and
- wherein in a case where it is not determined by the determination unit that the image pickup apparatus can receive the first charge completion information and the second charge completion information in the separate state, the transmission unit transmits the first charge completion information and the second charge completion information to the image pickup apparatus in the combined state.

11. The lighting device according to claim 10, wherein the transmission unit transmits a combined information item of the first charge completion information and the second charge completion information to the image pickup apparatus by analog communication, and
- wherein out of the first charge completion information and the second charge completion information as separate information items, the transmission unit transmits the first charge completion information to the image pickup apparatus by digital communication, and transmits the second charge completion information to the image pickup apparatus by analog communication.

12. The lighting device according to claim 10, wherein the transmission unit transmits a combined information item of the first charge completion information and the second charge completion information to the image pickup apparatus by digital communication, and
- wherein out of the first charge completion information and the second charge completion information as separate information items, the transmission unit transmits the first charge completion information to the image pickup apparatus by digital communication, and transmits the second charge completion information to the image pickup apparatus by analog communication.

13. The lighting device according to claim 10, wherein the transmission unit transmits a combined information item of the first charge completion information and the second charge completion information to the image pickup apparatus by analog communication,
- transmits the first charge completion information and the second charge completion information as separate information items to the image pickup apparatus by separating the contents of communication from each other, and
- further transmits the second charge completion information to the image pickup apparatus by analog communication, in a case where charging of all of the plurality of other lighting devices is completed.

14. The lighting device according to claim 10, wherein the transmission unit transmits a combined information item of the first charge completion information and the second charge completion information to the image pickup apparatus by analog communication, and
- out of the first charge completion information and the second charge completion information as separate information items, transmits the first charge completion information to the image pickup apparatus by analog communication, and transmits the second charge completion information to the image pickup apparatus by digital communication.

15. The lighting device according to claim 10, wherein the transmission unit transmits a combined information item of the first charge completion information and the second charge completion information to the image pickup apparatus by digital communication, and
- out of the first charge completion information and the second charge completion information as separate information items, transmits the first charge completion information to the image pickup apparatus by analog communication, and transmits the second charge completion information to the image pickup apparatus by digital communication.

16. The lighting device according to claim 10, wherein the transmission unit transmits a combined information item of the first charge completion information and the second charge completion information to the image pickup apparatus by analog communication, and
- transmits the first charge completion information and the second charge completion information as separate information items to the image pickup apparatus by digital communication by separating the contents of communication from each other.

17. The lighting device according to claim 10, wherein the transmission unit transmits a combined information item of the first charge completion information and the second charge completion information to the image pickup apparatus by digital communication, and
- transmits the first charge completion information and the second charge completion information as separate information items to the image pickup apparatus by digital communication by separating the contents of communication from each other.

18. The lighting device according to claim 14, wherein when transmitting the first charge completion information and the second charge completion information as separate information items to the image pickup apparatus by digital communication, the transmission unit transmits the second charge completion information separately as charge completion information of each of the plurality of other lighting devices and all charge completion information indicating that charging of all of the plurality of other lighting devices is completed.

19. A method of controlling a lighting device that is connected to a plurality of other lighting devices in a manner capable of performing wireless communication therewith, and is communicably attached to an image pickup apparatus, so as to be driven in synchronism with the plurality of other lighting devices, the lighting device acquiring charge completion information of the lighting device itself as first charge completion information, and acquiring charge completion information of the plurality of other lighting devices, from the plurality of other lighting devices, as second charge completion information, the method comprising:
- transmitting the first charge completion information and the second charge completion information in a combined state or transmitting the first charge completion information and the second charge completion information in a separate state; and
- determining whether or not an instruction for transmitting the first charge completion information and the second charge completion information in the separate state has been received from the image pickup apparatus by communication with the image pickup apparatus,
- wherein the transmitting includes, in a case where it is determined that the instruction for transmitting the first charge completion information and the second charge completion information in the separate state has been received from the image pickup apparatus, transmitting the first charge completion information and the second charge completion information to the image pickup apparatus in the separate state, and
- wherein the transmitting includes, in a case where it is not determined that the instruction for transmitting the first charge completion information and the second charge completion information in the separate state has been received from the image pickup apparatus, transmitting the first charge completion information and the second charge completion information to the image pickup apparatus in the combined state.

20. A method of method of controlling a lighting device that is connected to a plurality of other lighting devices in a manner capable of performing wireless communication therewith, and is communicably attached to an image pickup apparatus, so as to be driven in synchronism with the plurality of other lighting devices, the lighting device acquiring charge completion information of the lighting device itself as first charge completion information, and acquiring charge completion information of the plurality of other lighting devices, from the plurality of other lighting devices, as second charge completion information, the method comprising:
- transmitting the first charge completion information and the second charge completion information in a combined state or transmitting the first charge completion information and the second charge completion information in a separate state; and
- determining whether or not the image pickup apparatus can receive the first charge completion information and the second charge completion information in the separate state, based on model information of the image pickup apparatus, acquired by communication with the image pickup apparatus,
- wherein the transmitting includes, in a case where it is determined that the image pickup apparatus can receive the first charge completion information and the second charge completion information in the separate state, transmitting the first charge completion information and the second charge completion information to the image pickup apparatus in the separate state, and
- wherein the transmitting includes, in a case where it is not determined that the image pickup apparatus can receive the first charge completion information and the second charge completion information in the separate state, transmitting the first charge completion information and the second charge completion information to the image pickup apparatus in the combined state.

* * * * *